US007257942B2

(12) United States Patent
Schmeichel et al.

(10) Patent No.: US 7,257,942 B2
(45) Date of Patent: *Aug. 21, 2007

(54) APPARATUS FOR EMISSIONS CONTROL, SYSTEMS, AND METHODS

(75) Inventors: Steve D. Schmeichel, Wayzata, MN (US); Fred W. Schmidt, Eagan, MN (US); Julian A. Imes, Bloomington, MN (US); Robert Allen Dushek, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/646,359

(22) Filed: Aug. 22, 2003

(65) Prior Publication Data

US 2004/0093859 A1  May 20, 2004

Related U.S. Application Data

(60) Provisional application No. 60/405,524, filed on Aug. 23, 2002, provisional application No. 60/427,510, filed on Nov. 18, 2002, provisional application No. 60/421,889, filed on Oct. 28, 2002.

(51) Int. Cl.
*F01N 3/00* (2006.01)
(52) U.S. Cl. ............................ 60/283; 60/274; 60/297; 60/311; 55/DIG. 30
(58) Field of Classification Search ................ 60/274, 60/280, 283, 297, 311; 55/DIG. 19, 30
See application file for complete search history.

(56) References Cited

U.S. PATENT DOCUMENTS 4,282,713 A * 8/1981 Antoku et al. ................ 60/600

4,557,226 A    12/1985 Mayer et al.

(Continued)

FOREIGN PATENT DOCUMENTS

WO    PCT/US00/35523    12/2000

(Continued)

OTHER PUBLICATIONS

Cassagrande, *Recipes for Car Care, Guide to Auto Health*, Chapter 7: Emissions and Exhaust, pp. 127-145, (Dec. 12, 2000).

(Continued)

*Primary Examiner*—Thomas Denion
*Assistant Examiner*—Diem Tran
(74) *Attorney, Agent, or Firm*—Merchant & Gould P.C.

(57) ABSTRACT

Methods, constructions, and systems for treating engine emissions. An engine having a crankcase includes air intake, blow-by vent, and exhaust port; the crankcase emits blow-by gases through the blow-by vent and produces an exhaust stream through the exhaust port. The blow-by gases are directed through a blow-by filter to produce filtered gases. The filtered gases are directed back into the air intake of the crankcase; and the exhaust stream is treated with a catalyst arrangement. Total emissions of a turbo-charged diesel engine having an engine crankcase and an exhaust tailpipe are reducible. The total emissions includes particulate matter emissions from the engine crankcase added to the particulate matter emissions from the exhaust tailpipe. The method includes filtering blow-by gases and directing filtered blow-by gases back into the engine crankcase; and treating the exhaust stream with a catalyst; whereby the total emissions are reduced by greater than 25% when compared to the same engine that does not filter blow-by gases nor treat the exhaust stream. Usable systems include: a blow-by filter in gas-flow communication with a blow-by vent of an engine crankcase; and a diesel oxidation catalyst arrangement in gas-flow communication with an exhaust port of an engine crankcase.

13 Claims, 11 Drawing Sheets

U.S. PATENT DOCUMENTS

| | | | |
|---|---|---|---|
| 4,851,015 A | 7/1989 | Wagner et al. | |
| 5,205,265 A | * 4/1993 | Kashiyama et al. | ... 123/568.12 |
| 5,246,472 A | 9/1993 | Herman et al. | |
| 5,250,094 A | 10/1993 | Chung et al. | |
| 5,272,871 A | 12/1993 | Oshima et al. | |
| 5,426,269 A | 6/1995 | Wagner et al. | |
| 5,471,966 A | 12/1995 | Feuling | |
| 5,564,401 A | 10/1996 | Dickson | |
| 5,669,366 A | 9/1997 | Beach et al. | |
| 5,726,119 A | * 3/1998 | Sera et al. | ... 502/439 |
| 6,139,595 A | 10/2000 | Herman et al. | |
| 6,143,049 A | 11/2000 | Gieseke et al. | |
| 6,152,118 A | 11/2000 | Sasaki et al. | |
| 6,152,120 A | 11/2000 | Julazadeh | |
| 6,161,529 A | 12/2000 | Burgess | |
| 6,171,355 B1 | 1/2001 | Gieseke et al. | |
| 6,187,073 B1 | 2/2001 | Gieseke et al. | |
| 6,247,463 B1 | 6/2001 | Fedorowicz et al. | |
| 6,354,283 B1 | 3/2002 | Hawkins et al. | |
| 6,363,721 B1 | 4/2002 | Prenninger et al. | |
| 6,478,019 B2 | 11/2002 | Fedorowicz et al. | |
| 6,530,969 B2 | 3/2003 | Gieseke et al. | |
| 6,550,573 B2 | 4/2003 | Wagner et al. | |
| 6,561,171 B2 | 5/2003 | Burgess | |
| 6,640,792 B2 | 11/2003 | Harvey et al. | |
| 6,691,687 B1 | 2/2004 | Liang et al. | |
| 6,694,735 B2 | 2/2004 | Sumser et al. | |
| 6,892,715 B2 | 5/2005 | Norrick | |
| 6,902,604 B2 | 6/2005 | Heckel et al. | |
| 6,925,994 B2 | 8/2005 | Michel | |
| 2004/0112346 A1 | 6/2004 | Ahlborn et al. | |

FOREIGN PATENT DOCUMENTS

WO     WO 03/050398 A1     6/2003

OTHER PUBLICATIONS

"Environmental Protection Agency," *Federal Register*, Part II, 40 CFR Parts 69, 80, and 86, pp. 35430-35545 (Jun. 2, 2000).

"Final Statement of Reasons for Rulemaking, Including Summary of Comments and Agency Responses," *State of California. Air Resources Board*, Agenda Item No. 01-8-1, pp. i-ii, 87-89 (Oct. 25, 2001).

Satoh, K. et al., "Development of Method for Predicting Efficiency of Oil Mist Separators," *SAE Technical Paper Series*, 2000-01-1234, pp. 1-9 (Mar. 6-9, 2000).

Barris, Marty "Closed Crankcase Filtration: The Next Step in Diesel Engine Emissions Reduction", Clean Air Technology News, Fall 2000 (4 pages).

"EPA ULSD Regulation Takes Effect", Daily News, Oct. 16, 2006 (2 pages) http://cstorecentral.com/NACS/News/PrintArticle.htm?IssueDate=101606&file=nd10160....

* cited by examiner

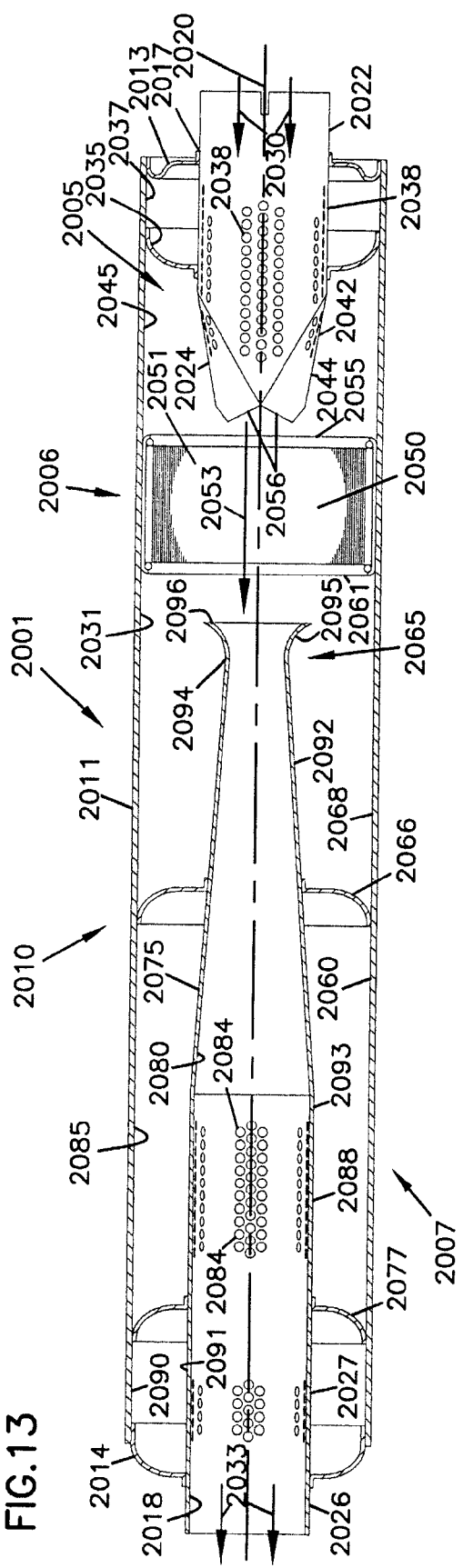
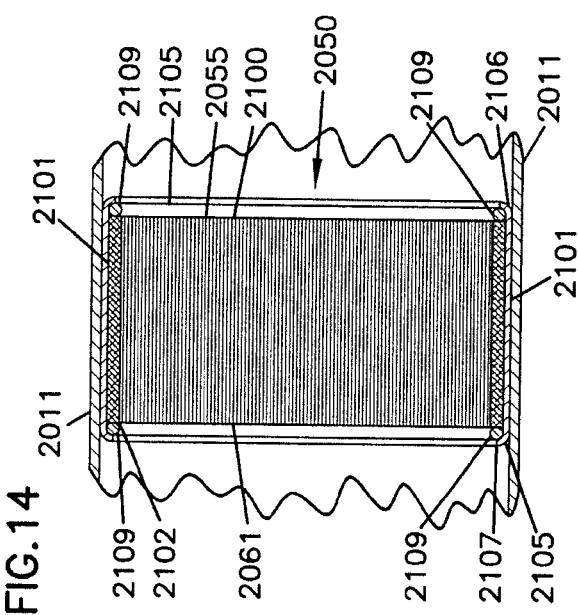
FIG. 13
FIG. 14

Engine: Cat 3406B
Rating: 325 HP
Date: 5/28/1998

Engine: Cat 3406B
Rating: 325 HP
Date: 12/6/1999

APPARATUS FOR EMISSIONS CONTROL, SYSTEMS, AND METHODS

CROSS-REFERENCE TO RELATED APPLICATIONS

This application claims priority under 35 U.S.C. § 119(e) to provisional patent application Ser. No. 60/405,524 filed Aug. 23, 2002, Ser. No. 60/421,889 filed Oct. 28, 2002, and Ser. No. 60/427,510 filed Nov. 18, 2002. The disclosures of Ser. No. 60/405,524 and 60/421,889 and 60/427,510 are incorporated herein by reference.

This application is related to and incorporates the following U.S. Patents herein by reference: U.S. Pat. No. 5,355,973; U.S. Pat. No. 5,426,269; U.S. Pat. No. 5,853,439; U.S. Pat. No. 6,171,355; U.S. Pat. No. 6,355,076; U.S. Pat. No. 6,143,049; U.S. Pat. No. 6,187,073; and U.S. Pat. No. 6,290,739. This application incorporates by reference PCT Publication WO 01/47618 published on Jul. 5, 2001, and PCT Publication WO 00/32295 published on Jun. 8, 2000. This application incorporates by reference commonly assigned U.S. patent application Ser. No. 10/168,906 filed Jun. 20, 2002, published on Mar. 20, 2003 as U.S. 2003-0051455 A1.

TECHNICAL FIELD

This disclosure relates to apparatus and methods for controlling emissions for internal combustion engines, in particular, diesel engines. Preferred arrangements include use of a closed-crankcase filter system, use of a catalytic converter muffler, and combinations thereof.

BACKGROUND

Blow-by gases are created by pressure leakage passed piston rings and by reciprocating motion of pistons. A draft tube from the crankcase emits blow-by in the form of aerosol and coalescence droplets. Chemically, these blow-by emissions are in the form of oil droplets, carbon soot, and debris from wear for fugitive dust. Physically, typically about 50% of the mass is less than one micrometer.

There are various systems that use open crankcase engines. These include heavy duty trucks and buses; light vehicles; off-road mobile vehicles; off-road equipment (e.g. industrial equipment, generators); and marine engines.

Tailpipe emissions include gases, particulate matter, and aerosols. These exhaust streams include hydrocarbons, carbon monoxide, soot, oxides of nitrogen, nitric oxide, nitrogen dioxide, particulate matter, sulfate, and other material.

SUMMARY

Methods, constructions, and systems for treating engine emissions are provided. In general, an engine having a crankcase is provided; the crankcase has an air intake, a blow-by vent, and an exhaust port; the crankcase emits blow-by gases through the blow-by vent and produces an exhaust stream through the exhaust port. At least a portion of the blow-by gases are directed through a blow-by filter to produce filtered gases. The filtered gases are directed back into the air intake of the crankcase; and at least a portion of the exhaust stream is treated with a catalyst arrangement.

Total emissions of a turbo-charged diesel engine having an engine crankcase and an exhaust tailpipe are reducible using methods and systems described herein. The total emissions includes particulate matter emissions from the engine crankcase added to the particulate matter emissions from the exhaust tailpipe. The method includes running the engine to produce crankcase blow-by gases and an exhaust stream; filtering the blow-by gases and directing filtered blow-by gases back into the engine crankcase; and treating the exhaust stream with a catalyst; whereby the total emissions are reduced by greater than 25% when compared to the same engine that does not filter the blow-by gases and that does not treat the exhaust stream with a catalyst.

Usable systems include: a diesel engine having a crankcase with an air intake, a blow-by vent, and an exhaust port; a blow-by filter in gas-flow communication with the blow-by vent of the crankcase; and a diesel oxidation catalyst arrangement in gas-flow communication with the exhaust port.

In examples of usable systems, there is further including an air filter upstream of the engine; a turbo downstream of the air filter and upstream of the crankcase; the turbo being in gas-flow communication with the air filter and the air intake of the crankcase; and the blow-by filter being downstream of the crankcase and upstream of the turbo; the blow-by filter including a filtered gas port; the filtered gas port being upstream of and in gas flow communication with the turbo.

BRIEF DESCRIPTION OF THE DRAWINGS

FIG. 13 is a cross-sectional view of the catalytic converter muffler shown in FIG. 12, the cross-section being taken along the line 13-13 of FIG. 12; and FIG. 14 is an enlarged, fragmentary view of a portion of the arrangement shown in FIG. 13.

DETAILED DESCRIPTION

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) carbon contaminant from combustion, typically comprising carbon particles, a majority of which are about 0.1-10 microns in size. Such "blow-by gases" are generally directed outwardly from the engine block, through a blow-by vent.

Exhaust gases are produced in the engine as part of the combustion process. The exhaust gases are directed out of the engine and through a tailpipe. Together, the blow-by gases and tailpipe emissions represent a total emissions volume being released from the engine.

Herein when the term "hydrophobic" fluids is used in reference to the entrained liquid aerosol in gas flow, reference is meant to nonaqueous fluids, especially oils. Generally such materials are immiscible in water. Herein the term "gas" or variants thereof, used in connection with the carrier fluid, refers to air, combustion off gases, and other carrier gases for the aerosol.

The gases may carry substantial amounts of other components. Such components may include, for example, copper, lead, silicone, aluminum, iron, chromium, sodium, molybdenum, tin, and other heavy metals.

Engines operating in such systems as trucks, farm machinery, boats, buses, and other systems generally comprising diesel engines, may have significant gas flows contaminated as described above. For example, flow rates and volumes on the order of 2-50 cubic feet per minute (cfm), typically 5 to 10 cfm, are fairly common.

Figure 1:
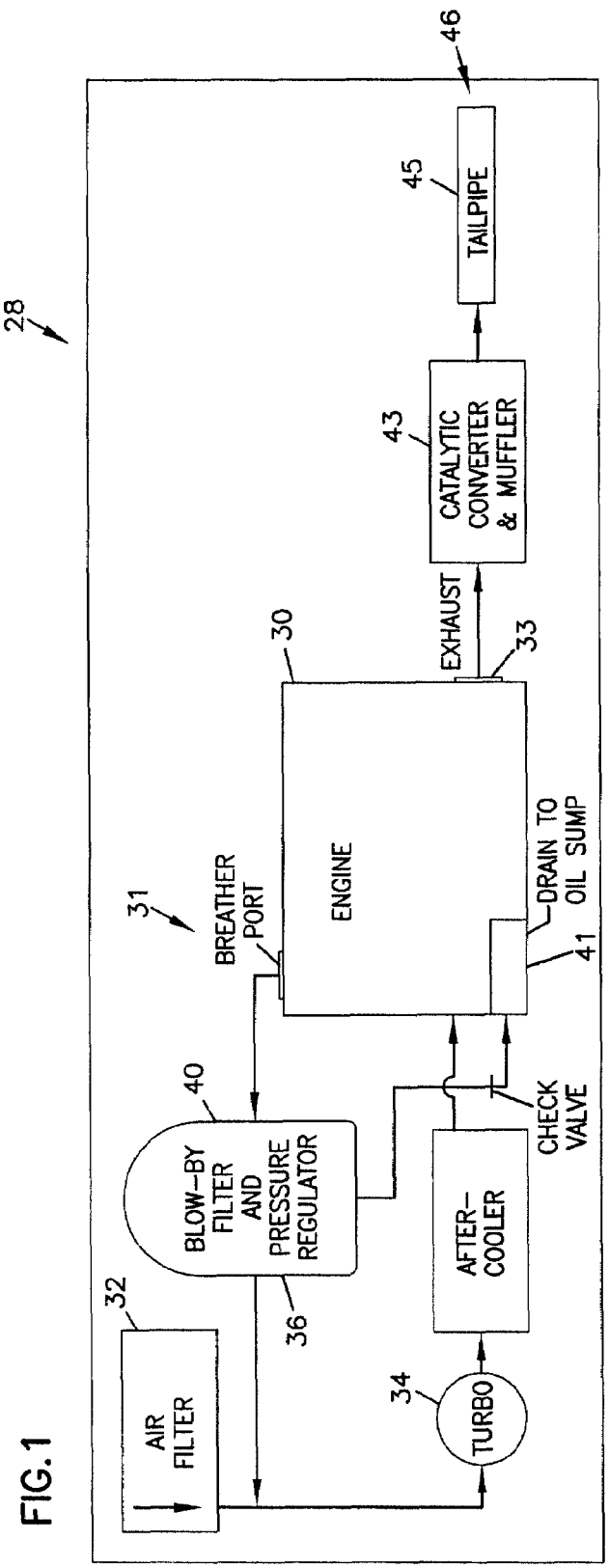
FIG. 1 is a schematic view of a vehicle or equipment having an engine with an air intake system and an exhaust system.

FIG. 1 illustrates a schematic indicating a typical system 28 in which arrangements to control total emissions would be utilized. The system 28 is depicted in a closed crankcase configuration (CCC). Referring to FIG. 1, block 30 represents a turbocharged diesel engine (also referred to herein as "engine crankcase" or just "crankcase"). Air is taken to the engine 30 through an air filter 32. Air filter or cleaner 32 cleans the air taken in from the atmosphere. A turbo 34 draws the clean air from the air filter 32 and pushes it into engine 30. While in engine 30, the air undergoes compression and combustion by engaging with pistons and fuel. During the combustion process, the engine 30 gives off blow-by gases through a vent 31 (also referred to herein as a crankcase emissions area or a breather port). A blow-by filter arrangement 36 is in gas flow communication with the vent 31 and cleans the blow-by gases to produce filtered gases. The air (filtered gases from the blow-by filter arrangement 36) is directed through a pressure regulator 40, which is integrated with the filter arrangement 36. From there, the air is again pulled through by the turbo 34 and into the engine 30. Regulator valve or pressure valve 40 regulates the amount of pressure in the engine crankcase 30. Pressure valve 40 opens more and more, as the pressure in the engine crankcase increases, in order to try to decrease the pressure to an optimal level. The pressure valve 40 closes to a smaller amount when it is desirable to increase the pressure within the engine. Oil recovered from the blow-by filter arrangement 36 is directed to drain to the oil sump at 41.

The filter arrangement 36 for separating a hydrophobic liquid phase from a gaseous stream (sometimes referred to herein as a coalescer/separator arrangement) is provided. This reduces crankcase emissions over systems lacking such a filter. In combination with a catalytic converter muffler, overall emissions (crankcase and tailpipe) are reduced. In operation, a contaminated gas flow is directed into the coalescer/separator arrangement 36. Within the arrangement 36, the fine oil phase or aerosol phase (i.e., hydrophobic phase) coalesces. The arrangement 36 is constructed so that as the hydrophobic phase coalesces into droplets, it will drain as a liquid such that it can readily be collected and removed from the system. With preferred arrangements as described hereinbelow, the coalescer or coalescer/separator, especially with the oil phase in part loaded thereon, operates as a prefilter for carbon contaminant carried in the gas stream. Indeed, in preferred systems, as the oil is drained from the system, it will provide some self-cleaning of the coalescer because the oil will carry therein a portion of the trapped carbon contaminant.

From the engine 30, exhaust gases are directed through an exhaust port 33 downstream to a diesel oxidation catalyst arrangement, embodied herein as a catalytic converter and muffler 43. The catalytic converter and muffler 43 includes a catalyst that allows for the oxidation of hydrocarbons in the gaseous phase, thereby reducing the concentration of hydrocarbons in the exhaust stream. Due to the concentration reduction, a lower amount of hydrocarbons would be adsorbed onto the surface of the carbonaceous particles or soot in the stream. Thus, there is a mass reduction in the tailpipe emissions when the catalytic converter is utilized. The muffler operates to reduce the sound pressure level emanating from the engine. From the catalytic converter and muffler 43, the exhaust gases are emitted from the tailpipe 45.

A. MULTI-STAGE OIL AEROSOL SEPARATOR EMBODIMENT, FIGS. 2-8

Figure 2:
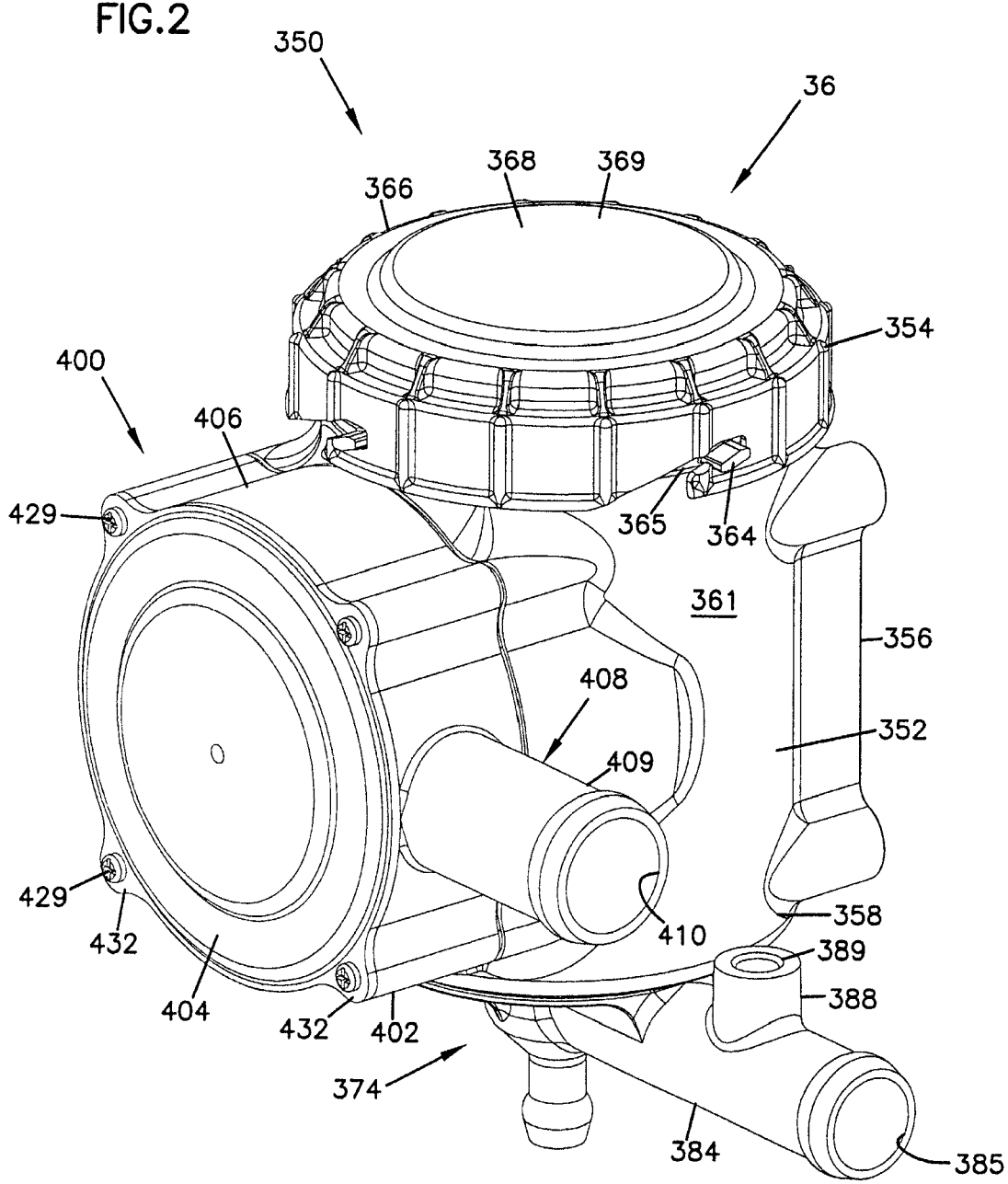
FIG. 2 is a perspective view of one embodiment of a filter arrangement useable with the system of FIG. 1, constructed according to principles of this disclosure.

Referring to FIG. 2, an embodiment of a blow-by filter 36, also referred to herein as a "crankcase gas filter" or "filter arrangement" 36 is depicted at reference numeral 350. The blow-by filter 36 can be embodied as described in, for example: U.S. patent publication US 2003-0051455 incorporated herein by reference; commonly assigned provisional patent application 60/427,510, incorporated herein by reference; U.S. Pat. No. 6,290,739, incorporated herein by reference; U.S. Pat. No. 6,530,969 incorporated herein by reference; U.S. Pat. No. 6,143,049 incorporated herein by reference; and U.S. Pat. Nos. 5,853,439, 6,171,355, 6,355,076, and 6540801 each incorporated herein by reference.

The filter arrangement 350 depicted includes a housing 352 holding a filter element 340 and a regulator valve assembly 351. In the one depicted in the drawings, the housing 352 includes: a body subassembly 357; a valve housing subassembly 400; and a fluid port construction 374.

Figure 3:
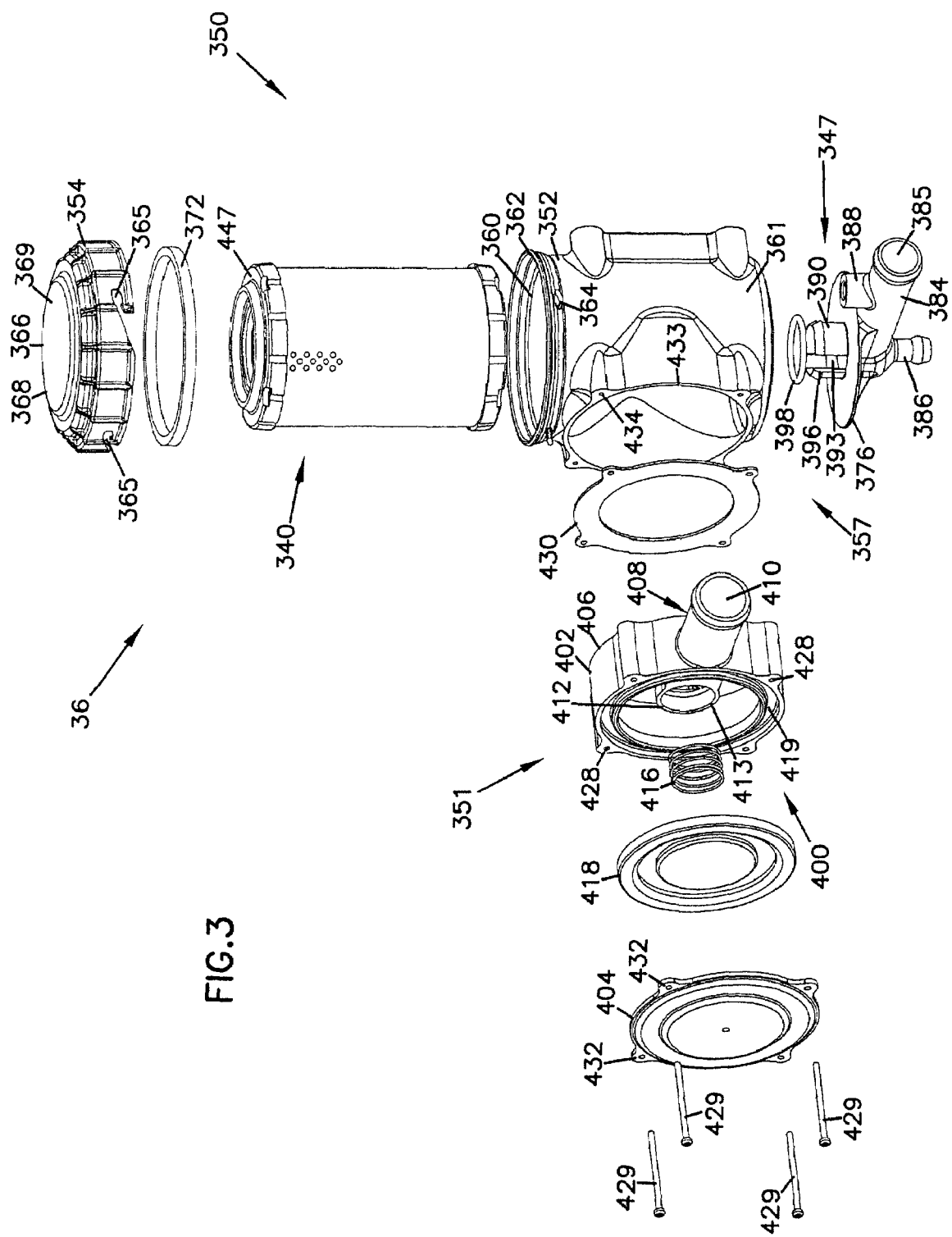
FIG. 3 is an exploded view of the filter arrangement depicted in FIG. 2.

In the embodiment depicted in FIG. 2, the housing 352 includes a service cover 354 removably attachable to housing body 356. The housing body 356, in the embodiment depicted, includes a generally cylindrical wall 358 defining an interior volume 360 (FIG. 3). The wall 358 includes, on an exterior portion 361, engagement or fastener structure 362 (FIG. 3) for receiving the service cover 354. In particular, the fastener structure 362 includes threads 363 and protrusions 364 that act as stops for the service cover 354 engagement. The service cover 354 defines recesses 365 that receive the protrusion 364 and engage the service cover 354 with the protrusions 364 to prevent rotation of the service cover 354 relative to the body 356.

The service cover 354 has a generally cylindrical outer wall 366, which defines the recesses 365. Joining the outer wall 366 is an end wall 368. When the filter arrangement 350 is operably installed on an engine crankcase, such as the one shown in FIG. 1 at 30, the end wall 368 will form a top cover 369.

Figure 5:
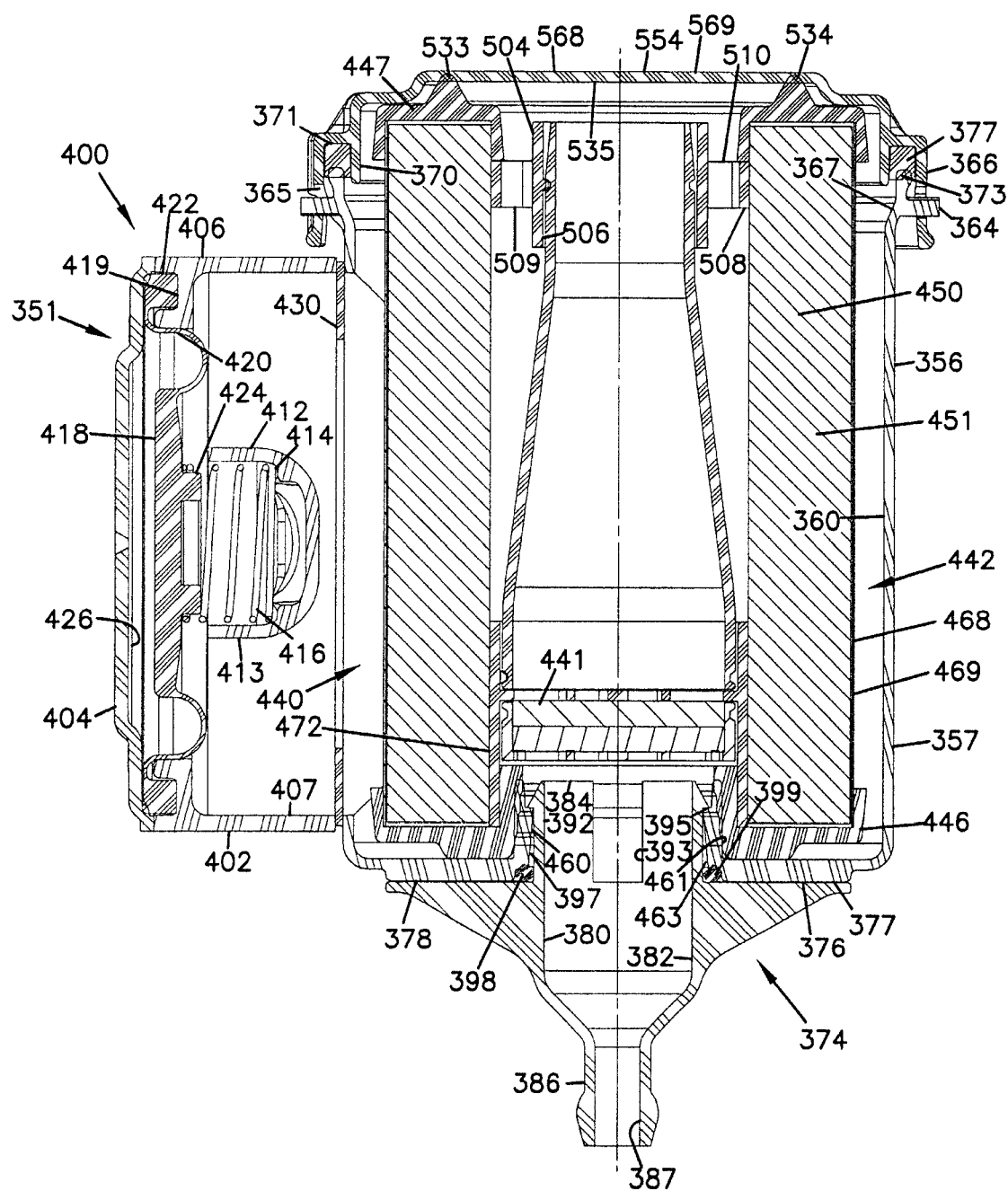
FIG. 5 is a cross-sectional view of the filter arrangement depicted in FIGS. 2-4, the cross-section being taken along the line 5-5 of FIG. 4.

In FIG. 5, it can be seen that the service cover 354 also includes an inner wall 3070. The inner wall 3070 is circumscribed by the outer wall 366. Between the inner wall 370 and the outer wall 366, there is defined a groove 371. The groove 371 holds a gasket member 372 for forming a seal 373 between the service cover 354 and the body 356.

Secured to and an integral part of the body 356 is first fluid port construction 374. The first fluid port construction 374 includes a base 376 for engagement with surface 377, forming an end wall 378 for body subassembly 357. The base 376 defines an inner channel or bore 380. The inner bore 380 is in fluid communication with an interior volume 417 of the filter arrangement 350 and with fluid channels outside of the filter arrangement 350, to be explained further below. The inner bore 380 forms a first fluid port 382, which, in certain preferred applications, forms both a fluid inlet and a fluid outlet port, to be explained further below. Extending from the base 376, and in fluid communication with the bore 380, is a fluid tube 384 (FIG. 2) defining a channel or bore 385. Also extending from the base 376 and being coaxial therewith is a fluid tube 386. The tube 386 defines a fluid channel or bore 387. In FIG. 2, it can be seen how the tube 384 and tube 386, in this particular embodiment, have axes that are perpendicular relative to each other. As will be explained further below, in preferred embodiments, the bore 385 receives below-by gases from an engine crankcase, while the bore 387 receives coalesced liquid from the filter arrangement 350 to be returned to, for example, an engine sump. In the particular embodiment illustrated, the tube 384 has a tube 388 extending therefrom. The tube 388 defines a fluid channel or bore 389 for connection to appropriate fluid conduits. Extending from the base 376, and forming a part of the bore 380, is a tube section 390. The tube section 390, in the embodiment shown, is a slotted cylindrical wall 392. The wall 392 defines a plurality of slots 393, extending completely from free end 394 to the base 376. The slots 393 allow the tube section 390 to flex radially inwardly to mateably engage with an end portion 395 of a neck 463 of the body subassembly 357. The wall 392 has catches 396 to allow for the engagement with the end portion 395.

In the embodiment illustrated, a gasket member 398 is oriented between the first fluid port construction 374 and the body subassembly 357, between base 376 and surface 377, to form a seal 399 and prevent leakage therebetween. The neck 463 projects axially inwardly from wall 378 of the body subassembly 357. The neck 463 defines the end portion 395 of the body subassembly 357, which engages the catches 396 of the wall 392. The neck 363 defines an aperture 397, which receives the tube section 390.

Secured to the body subassembly 357, and part of the overall body 356, is valve housing subassembly 400. The valve housing subassembly holds the regulator valve assembly 351. The valve housing subassembly 400 includes a valve housing body 402 and a valve housing cover 404. The valve housing body 402 includes an outer wall 406 defining an open interior volume 407 (FIG. 5).

Figure 4:
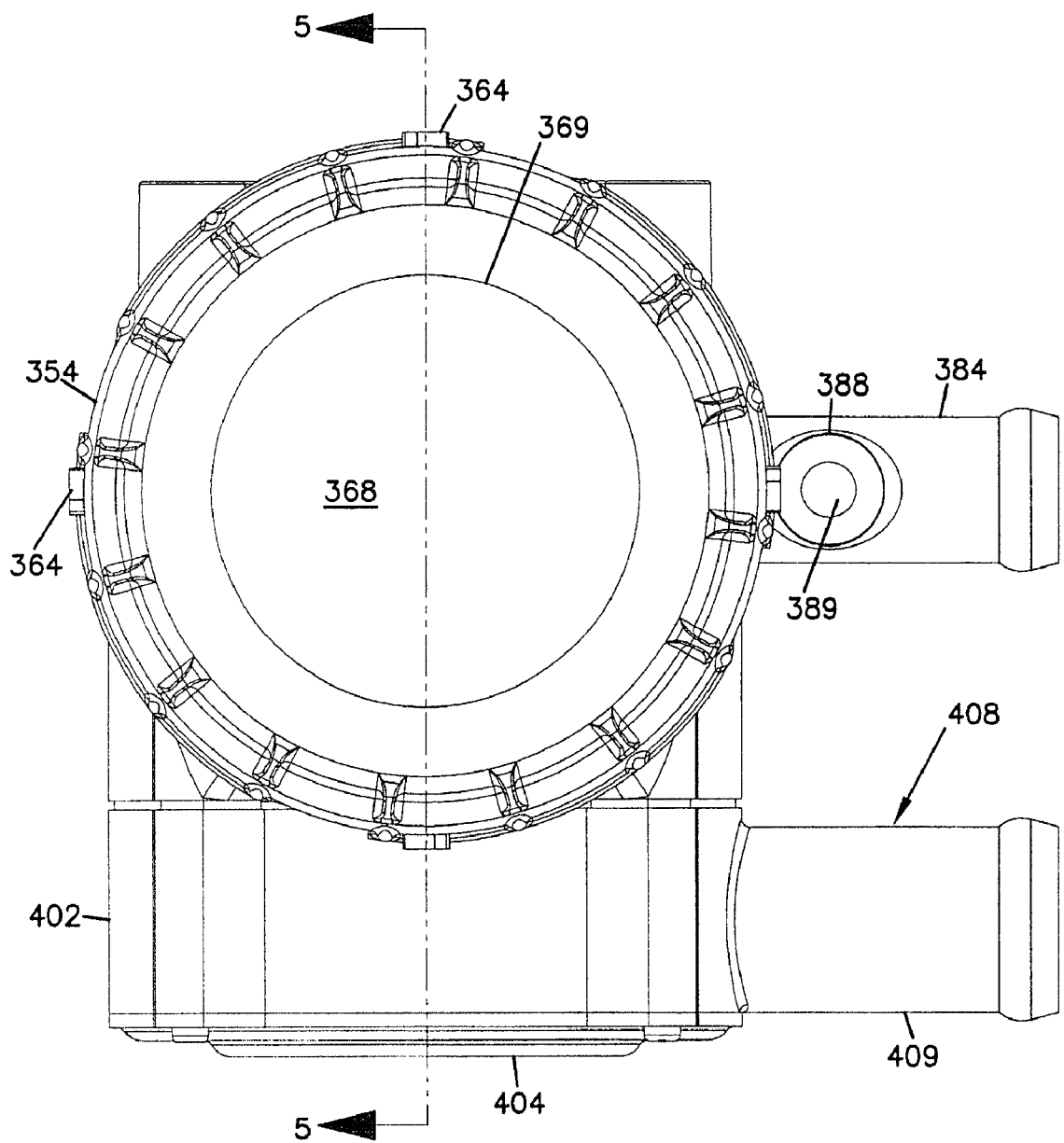
FIG. 4 is a top plan view of the filter arrangement depicted in FIG. 2.

A second fluid port construction 408 (FIGS. 2-4) is in fluid communication with the interior volume 407 (FIG. 5). The second fluid port construction 408 includes a tube 409 extending from the outer wall 406 and defines an inner fluid passage or bore 410. The tube 409 passes through the outer wall 406 and terminates at a valve seat 412 (FIGS. 3 and 5).

The valve seat 412 is defined by a tubular wall 413, which is circumscribed by the outer wall 406.

In FIG. 5, it can be seen that the valve seat 412 defines an inner shoulder 414. The shoulder 414 supports a portion of the valve assembly 3051, a biasing mechanism, such as a spring 416. The spring 416 is biased against another part of the valve assembly 351, diaphragm 418. The diaphragm 418 is held by a groove 419 defined between the outer wall 406 and an internal ring 420 circumscribed by the outer wall 406. As such, the diaphragm 418 is operably oriented between the valve housing cover 404 and the valve housing body 402.

The diaphragm 418, in the embodiment illustrated, includes an outer lip 422 that is seated within the groove 419. The diaphragm 418 extends from the groove 419 and extends across the valve housing body 402 to cover and close the interior volume 407. The diaphragm 418, in the embodiment illustrated, includes an axial extending ring 424 that engages and is received within the spring 416.

Between the diaphragm 418 and service cover 404 is an open volume 426. In operation, when the filter arrangement 350 has sufficient pressure therewithin to overcome the compressive force of the spring 416, the diaphragm 418 is elastically deformed to occupy the space in the volume 426.

The valve housing body 402 includes a plurality of threaded bores 428 for accommodating fasteners, such as bolts 429 to allows selective removability and attachment of the valve housing subassembly 400 to the body assembly 357. This permits servicing of the regulator valve construction 351. A plate 430 is provided to ensure a good connection between the body subassembly 357 and the valve housing subassembly 400. In FIG. 3, it can be seen how the body assembly 357 defines surface 433 for interfacing with the valve housing subassembly 400. In particular, the surface 433 engages the plate 430 and also defines therein fastener receiving bores 434.

The cover 404 is removably attachable to the valve housing body 402. As can be seen in FIGS. 2 and 3, the cover 404 defines fastener flanges 432 for receiving the bolts 429. In the exploded view shown in FIG. 3, it can be seen how the filter arrangement 350 includes within the housing 352 a removable and replaceable filter element 440. The filter element 440 includes within it a first stage coalescer filter 441 and a second stage filter media 442. In use, a liquid entrained gas stream is directed through the first stage coalescer filter 441, in which a portion of the liquid phase is coalesced and removed from the gaseous stream by the first stage coalescer filter 441. The liquid that is coalesced within the first stage coalescer filter 441 drains and exits the housing 352 through the first fluid port construction 374. The gas phase is directed through the second stage filter media 442. The second stage 442 removes at least a portion of particulates from the gas stream, and then the cleaned gas stream is directed into the valve housing subassembly 400 and out through the second fluid port construction 408.

Figure 6:
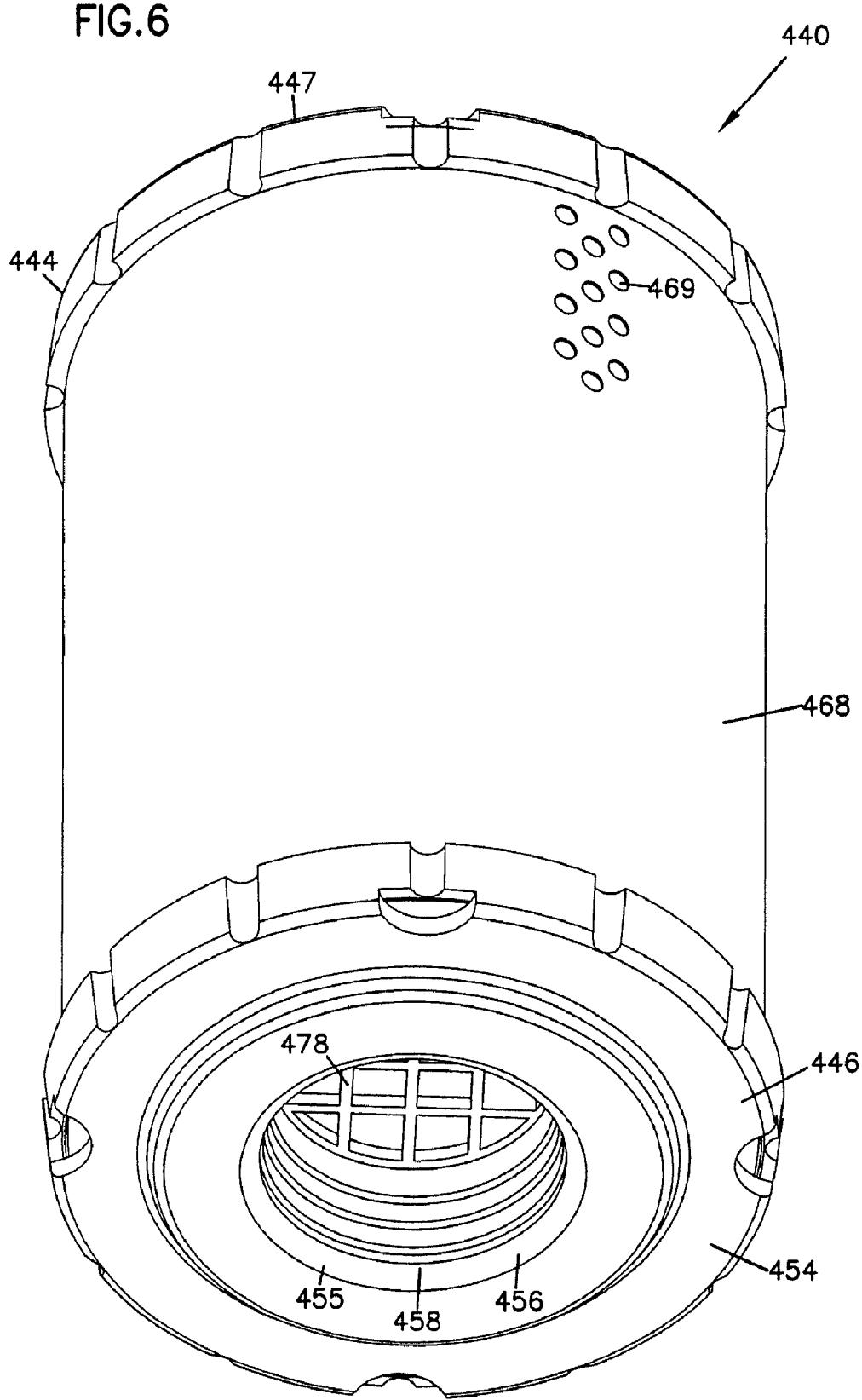
FIG. 6 is a schematic, perspective view of a filter element usable in the filter arrangement of FIGS. 2-5.
Figure 7:
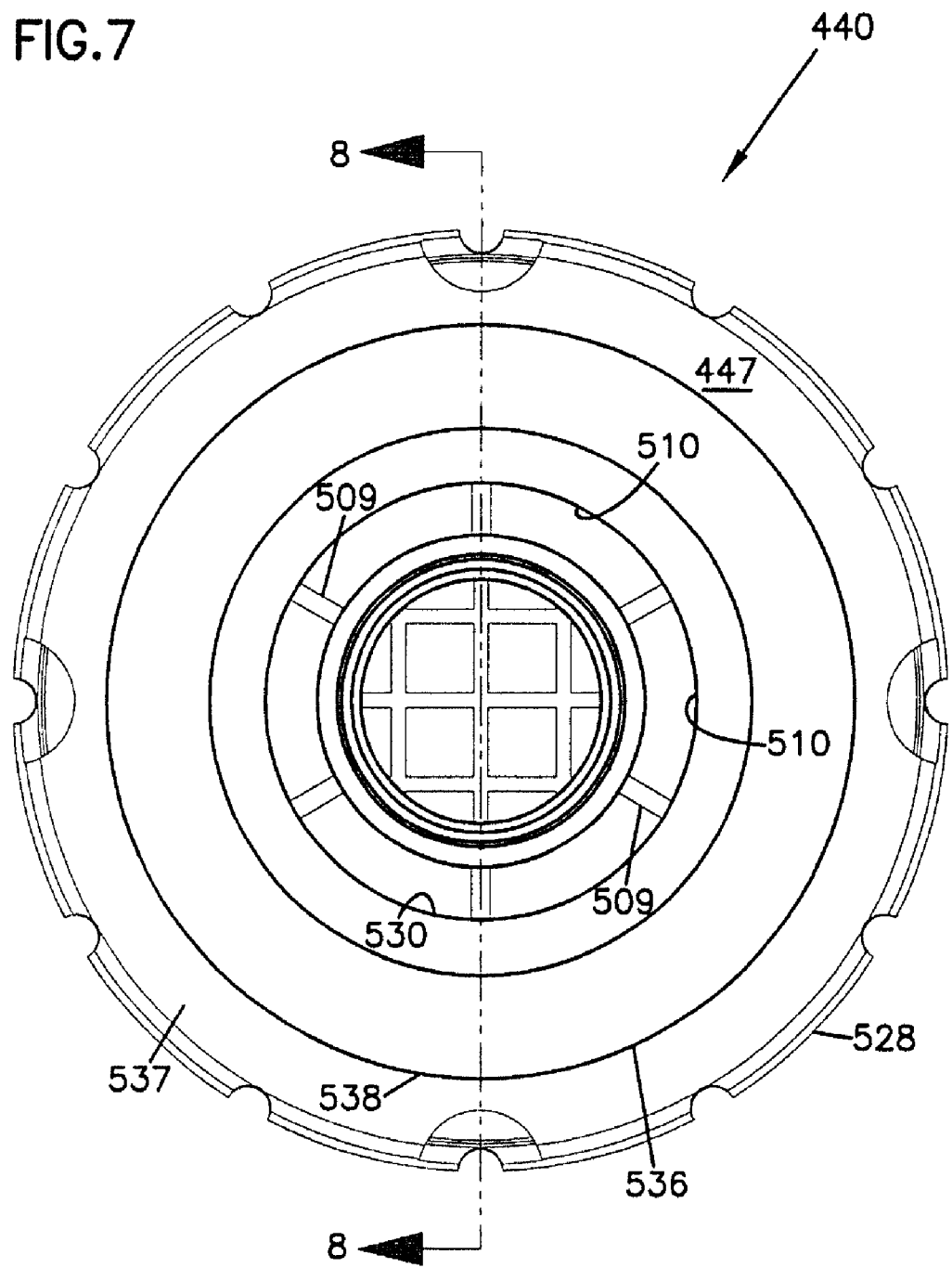
FIG. 7 is a top plan view of the filter element of FIG. 6.
Figure 8:
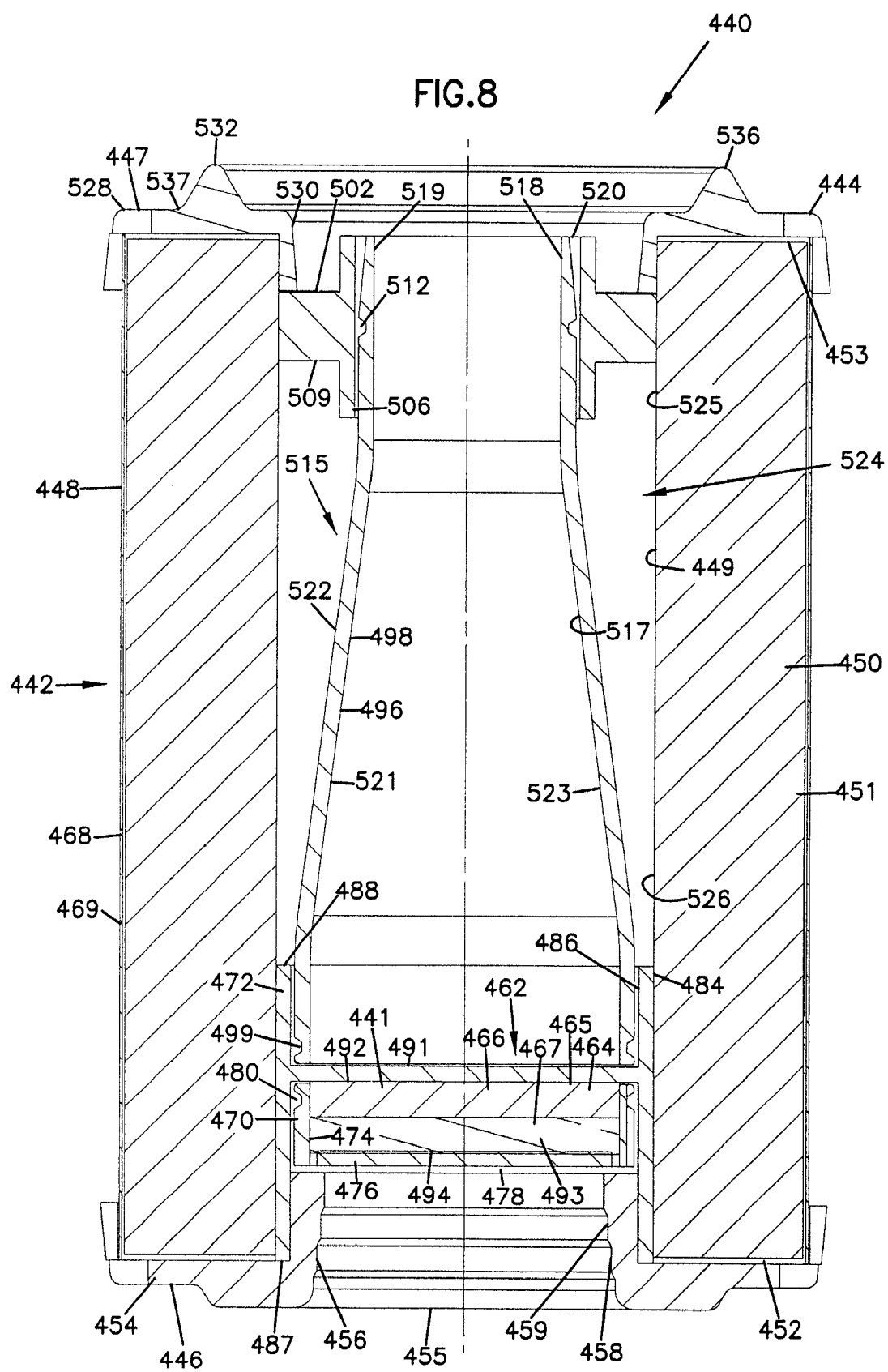
FIG. 8 is a cross-sectional view of the filter element of FIGS. 6 and 7, the cross-section being taken along the line 8-8 of FIG. 7.
Figure 10:
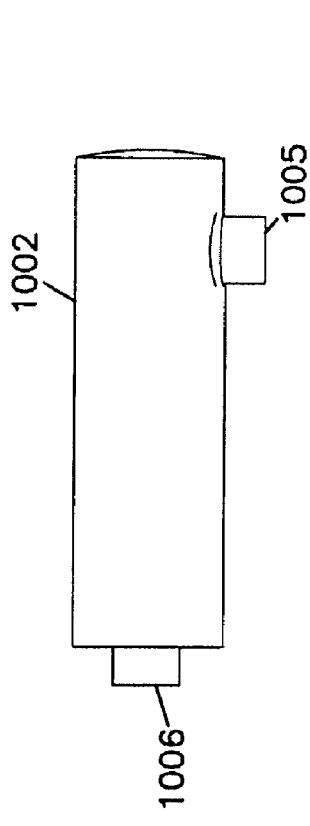
FIG. 10 is a side elevational view of another embodiment of a catalytic converter muffler useable according to principles of this disclosure.
Figure 12:
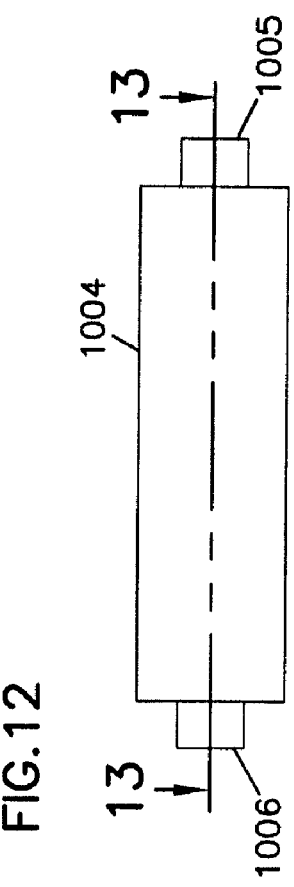
FIG. 12 is a side elevational view of another embodiment of a catalytic converter muffler useable according to principles of this disclosure.
Figure 9:
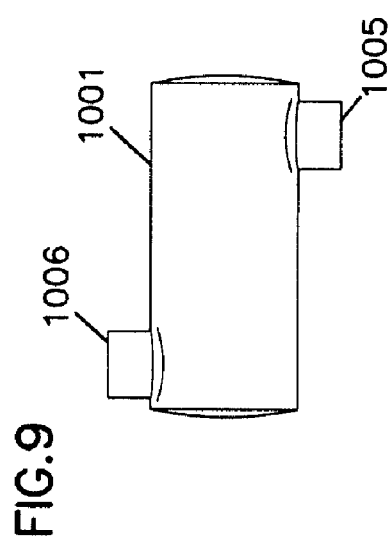
FIG. 9 is a schematic, side elevational view of one catalytic converter muffler useable according to principles of this disclosure.
Figure 11:
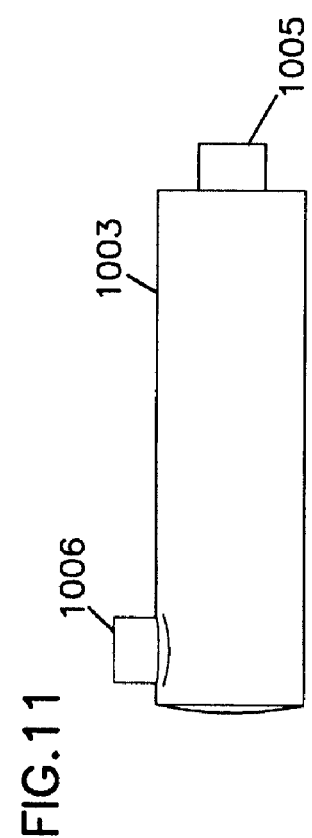
FIG. 11 is a side elevational view of another embodiment of a catalytic converter muffler useable according to principles of this disclosure.

In reference now to FIGS. 6-8, the filter element 440 is depicted as a single, unitary construction 444. In preferred embodiments, the filter element 440 is removable and replaceable from the housing 352. As used herein, the term "unitary" means that the first stage filter 441 and the second stage media 442 cannot be separated without destroying a portion of the element 440. In the particular embodiment illustrated, the element 340 includes first and second opposite end caps 446, 447 that are part of the unitary construction 444. When the filter element 440 is handled, for example, during servicing, both the first stage coalescer filter 441 and the second stage media construction 442 are handled together.

The filter element 440, in preferred embodiments, is constructed similarly to filter element embodiments described in publication WO 01/47618, published on Jul. 5, 2001 and incorporated herein by reference.

In general, the second stage media construction 442 includes a tubular construction of media 448 defining an open filter interior volume 449 (FIG. 8). In preferred implementations, the tubular construction of media 448 will be configured to have a generally cylindrical shape, defining a circular cross-section.

In certain preferred embodiments, the tubular construction of media 448 includes pleated media 450. The pleated media 450 defines a plurality of pleats 451 from which gas to be treated flows. The pleated media 450 acts as a polishing filter to remove some of the particulates and debris from the gas stream before exiting the filter arrangement 350.

The pleated media 450 has a first end 452 and an opposite, second end 453. The length of the individual pleats 451 of the pleat media 450 extends between the first end 452 and the second end 453. In the particular embodiment illustrated, the first end cap 446 is secured to the first end 452 of the media 442, while the second end cap 447 is secured to the second end 453. In certain preferred implementations, the pleated media 450 is embedded and molded within the end caps 446, 447.

The filter element 440 depicted includes at least one filter support 468. In the embodiment shown, the support 468 is an outer, perforated liner 469, extending between the first and second end caps 446, 447 and circumscribing the media 448. In other embodiments, there may be an inner liner within the media 448.

In preferred embodiments, the end cap 446 includes a ring 454 of a molded, polymeric material. The ring 454 defines a center aperture 455 that, in the preferred embodiment illustrated, is centered in the ring 454. By "centered", it is meant that the aperture 455 has a center of symmetry that is the same as the center of symmetry of the ring 454. In other words, the center 455 is preferably not eccentrically disposed within the ring 454.

The ring 454 also includes an inner, annular surface 456. When filter element 440 is operably assembled within housing 352, the inner annular sealing surface 456 functions as a sealing portion 458. In preferred arrangements, the sealing portion 458 includes a stepped construction 459.

In particular, the stepped construction 459 helps with the insertion and formation of a radial seal 460 (FIG. 5) between the end-cap 446 and the sealing surface 457 of the housing 352. In FIG. 8, the stepped construction 459 includes decreasing diameters and results in a construction that helps with the insertion of the filter element 440 in the body 356. Note that, in the embodiment illustrated, the sealing surface 457 is along an outer wall 461 of a neck 463 of the body subassembly 357.

The sealing portion 458 of the end cap 447 is preferably made from a compressible material, such that there is radial compression of the sealing portion 458 against the sealing surface 457, when the element is operably installed in the housing 352. In general, preferred end caps 446 will comprise a soft, polyurethane foam having an as-molded density of typically, less than 22 lbs per cubic foot, for example about 14-22 lbs. per cubic foot.

Still in reference to FIG. 8, there is a frame construction 462 oriented in the center aperture 455 of the ring 454. The frame construction 462 holds, contains, and encapsulates a region of fibrous media 464. In the construction shown, the fibrous media 464 is used as the first stage coalescer filter 441. In certain preferred arrangements, the fibrous media 464 comprises at least one layer, and typically, a plurality of layers 465 of nonwoven, nonpleated, non open-tubular, coalescing media. In the embodiment shown in FIG. 8, there are two layers 466, 467 of fibrous media 464. Certain usable, example materials for the fibrous media 464 are described further below.

Still in reference to FIG. 8, in the frame construction 462 depicted, the frame construction 462 is a multi-piece, in particular, a two-piece construction including a first frame piece 470 and a second frame piece 472. The first frame piece 470 has a wall or an outer annular rim 474. Axially spanning across one end of the rim 474 and integral with it is a support grid 476, preferably in the form of a porous, mesh screen 478. The screen 478 provides structural support to the media 464 and permits gas flow to reach the media 464.

The wall or rim 474 preferably defines a recess 480 for engaging and receiving a mating detent 482. The detent 482 is part of the second frame piece 472, in the particular preferred embodiment illustrated. The detent 482, recess 480 arrangement provides for convenient, quick assembly and permits the first and second frame pieces 470, 472 to be snapped together. Of course, many other embodiments of mechanical engagement between the first and second frame pieces 470, 472 are contemplated.

The second frame piece 472 preferably includes an annular wall 484 surrounding and defining an open volume 486. In the particular embodiment illustrated, the wall 484 has a generally circular cross-section, which may be constant (to form a cylinder) or tapered to form a conical shape. The second frame piece wall 484 includes first and second opposite ends, 487, 488. In the embodiment illustrated, the end 487 generally corresponds to an inlet end. In preferred orientations, the end 487 will also correspond to an outlet end for coalesced liquids.

Second frame piece 472 also preferably includes a support grid 490 spanning the open volume 486 and integral with the wall 484. Preferably, the grid 490 comprises a screen 491. The screen 491 provides structural support to the coalescing media 464 and preferably engages and holds the downstream face 492 of the media 464.

The first and second frame pieces 470, 472 form an interior volume or retaining pocket 493 to hold, entrap, and encapsulate the coalescing media 464. Preferably, the media 464 is mechanically compressed within the pocket 493, such that the grid 476 engages the upstream face 494 and the grid 490 engages the downstream face 492. As described above, the wall 484 includes projection or detent 482 extending or projecting internally into the volume 486 to engage or snap into the recess 480.

The second frame piece 472 also includes mechanical engagement structure to securably attach to a wall 496 of a tube 498. In particular, the second frame piece 472 and the tube 498 also includes mechanical engagement structure, such as a detent/recess engagement 499. In this manner, the second frame piece 472 easily snaps and interlocks with the tube 498.

Preferred frame constructions 462 also include support ring or frame 502. The support frame 502 helps to center the frame construction 462 and hold it evenly within an open filter interior 449. The support frame 502, in the one depicted, in FIG. 5, includes a ring construction 504 having at least an inner ring 506 and an outer ring 508. The inner ring 506 and the outer ring 508 are preferably joined by a plurality of spokes or ribs 509. Between the inner rings 508 and outer ring 509, the ring construction 504 defines a plurality of gas flow passageways 510 (FIG. 7).

The ring construction 504 and the tube 498 are constructed and arranged to permit convenient manufacturing and assembly. In particular, the ring construction 504 and the tube 498 are configured to be secured together, such as by a mechanical engagement such as a detent/recess arrangement 512.

Referring again to FIG. 8, the filter element 440 preferably includes a flow construction arrangement 515 oriented to direct fluid, such as gas, from the first region of media 441 toward the second stage media 442. In general, the flow construction arrangement 515 preferably includes tube 498 formed by impervious, continuous, uninterrupted wall 496 surrounding and defining an open, fluid passage 517. In preferred embodiments, the tube 498 extends from the downstream face 492 of the first stage coalescer filter 441 at least partially in a direction toward the second end cap 447. In preferred embodiments, the tube 498 extends a complete distance between the downstream face 492 and the second end cap 447. In the particular arrangement depicted, the tube 498 forms an aperture 518, preferably a fluid exit aperture 519, at the end 520 of the wall 516 adjacent to the second end cap 447. In this manner, in this particular arrangement, in preferred embodiments, liquid that is coalesced by the first stage coalescer filter 441 is allowed to collect along the interior 521 of the tube 498 and drip by gravity back through the first stage media 441 and through the first flow port 374 (FIG. 5). Alternate drain arrangements are also usable. While in the depicted embodiment, the entire wall 516 includes an imperforate section 522, in other embodiments, only portions of the wall 496 will be imperforate.

In the embodiment of FIG. 8, the flow construction arrangement 515 is depicted as a conical section 523 having a sloped or tapered wall 496. In preferred constructions, the angle of taper on the wall 496 will be adjusted depending upon the overall length of the element 440.

After passing through the first stage coalescer filter 441, the gas flows through the fluid passageway 517, out through exit aperture 518, and then into a gas flow plenum 524. The gas flow plenum 524 is formed between the wall 496 of the tube 498 and the pleated media 450. The taper on the wall 496 causes the gas flow plenum 524 to be angled between a volume 525 adjacent to the second end cap 447 and a volume 526 adjacent to the first end cap 446 and the frame construction 462 that is smaller than volume 525.

The depicted second end cap 447 includes a ring 528 defining a center aperture 530. The end cap 447 supports a sealing arrangement 532 for forming a seal 533 (FIG. 5) with the housing 352. In the embodiment illustrated in FIG. 5, the particular seal 533 depicted is an axial seal 534 formed between the filter element 440 and an inner sealing surface 535 of the cover member 354. In preferred embodiments, the sealing arrangement 532 includes a projection 536 extending or projecting in an axial direction from a generally flat, planar portion 537 of the second end cap 447. In many preferred embodiments, the projection 536 forms a continuous ring 538 (FIG. 7). Preferred constructions include the end cap 447 and the projection 536 being a single, unitary, molded construction. In preferred embodiments, the end cap 447 is made from a polymeric material, preferably, a compressible polymeric material such as polyurethane. In many preferred embodiments, the second end cap 447 is made from the same material as the first end cap 446. The axial seal 534 helps to prevent gas from bypassing the first stage coalescer filter 441 and the second stage construction of filter media 442.

In preferred applications, the filter arrangement 350 will be mounted for use with engine crankcase 30 in a "top-load" orientation. By the term "top-load", it is meant that the filter arrangement 350 is installed with respect to the engine crankcase 30 in an orientation that permits servicing or access to the filter arrangement 350 from a position over or above the crankcase, when the engine crankcase 30 is in normal, operable orientation. In top-load configurations, the person servicing the filter arrangement 350 is not required to be in a position underneath or below the engine crankcase 30. Instead, the person servicing the filter arrangement 350 is able to access it from the top of the engine crankcase 30. For example, in a vehicle having an engine that is selectively accessible by a moveable hood, the filter arrangement 350 would be accessible merely by raising the hood of the vehicle and then removing the service cover 354 of the housing 352. It should be understood that alternate orientations of the filter arrangement 350 could also be used.

In operation, one typical filter arrangement 350 would work as follows. Blow-by gases 38 from engine crankcase 30 are taken in through the fluid channel 385 defined by the tube 384. The gases pass into the first fluid port construction 374 and through the fluid channel 380. From there, the gases flow through the first stage coalescer media 441. The coalescer media 441 separates liquids, with any entrained solids, from the rest of the gas stream. The liquid flows out of the first stage coalescer media 441 and, in the preferred orientation (in a top-load configuration), drips back through the coalescer media 441 and drains by gravity back through the first fluid port construction 374. The liquid, which is often oil, will typically be drained through the channel 387 and directed to an oil sump 41 for reuse by the crankcase 30.

The gas stream that is not coalesced by the first stage coalescer filter 441 flows through the fluid passage 517 of the flow construction 515 and through the exit aperture 518, around the end 520 of the wall 496 (making about 180° turn), through the gas flow passageway 510 and into the gas flow plenum 524. Some liquid that remains in the gas may coalesce by impingement against the wall 496 of the flow construction 515 and drip by gravity back through the first stage coalescer filter and then exit the filter arrangement 350 through the first fluid port construction 374.

From the gas flow plenum 524, the gas flows through the second stage filter media 442, which removes additional particles and solids from the gas stream. The gas flow is prevented from bypassing the second stage media 442 due to the seals 460, 533. The cleaned gas then flows downstream from the second stage filter media 442 and into the valve housing subassembly 400.

The gas flows into the interior volume 407 and into the valve seat 412. The gas exits the filter arrangement 350 through the second fluid port construction 408 (also referred to herein as a "filtered gas port"), in particular through the fluid bore or channel 410. From there, the gas is pulled by the turbo 34 back into the engine 300. The regulator valve construction 351 regulates the amount of pressure in the engine crankcase 30. As pressure in the engine crankcase 30 increases, the gas within the volume 407 has an increased pressure. This pressure results in a force to move the diaphragm 418 in a direction against the spring 416 and into the volume 426 toward the valve housing cover 404. When the diaphragm 418 is moved in this direction, the channel 410 is opened more to allow more volume of gas to flow therethrough. When the pressure within the engine crankcase 30 decreases, the regulator valve construction 351 adjusts, in that the diaphragm 418 moves away from the cover 404 and this decreases the opening allowed to flow into the channel 410. When the air intake system vacuum increases, the regulator valve construction 351 closes to prevent the crankcase 30 from reaching larger negative pressures.

The filter arrangement 350 is serviced as follows. When the filter arrangement 350 is mounted in a top-load configuration and the engine crankcase is in a normal, operable orientation, the cover 354 is removed from the housing body 356 by accessing the filter arrangement 350 from a position above or over the engine crankcase 30. If a moveable hood protects the engine, the hood is first raised to expose the engine 30, and then the service cover 354 is removed from a position over the crankcase 30.

The cover 354 is removed from the body 356 by rotating the cover 354 relative to the body 356 and releasing the protrusions 364 from the recesses 365. When the cover 354 is removed from the body 356, the seal 533 between the body 356 and the cover 354 is released. The filter element 440 is exposed. The end of the filter element 440 adjacent to the second end cap 447 is grasped, typically by hand, and the filter element 440 is pulled in an axial direction from the interior 360 of the body 356. As the filter element 440 is pulled from the interior 360, the radial seal 460 between the filter element 440 and body 356 is released. This step removes simultaneously both the first stage coalescer filter 441 and the second stage media construction 442. The filter element 440 is removed from the housing 352 from a position above or over the engine crankcase 30, in preferred orientations. This filter element 440 may then be disposed of, such as by incineration.

A second, new, replacement filter element 440 is then provided. The replacement element 440 also includes the first stage coalescer filter 441 and the second stage media construction 442. The replacement element 440 is inserted through the open end 367 of the body 356. Note that the open end 367 is at an opposite end from the opening of the neck 463. The filter element 440 is oriented such that the sealing portion 458 of the first end cap 446 is compressed between and against the first frame member 472 and the sealing surface 457 of the neck 463 to form radial seal 460 therebetween.

Next, the service cover 354 is placed over the opening 367 of the housing body 356. The cover 354 is rotated into operable security with the body 356 until the protrusions 364 are located within the recesses 365. This also creates axial seal 533 between the service cover 354 and the element 440 by compression of the seal projection 536 on the second end cap 447 against the service cover 354.

Filtration System Performance

Long Term Performance Stability

Figure 15:
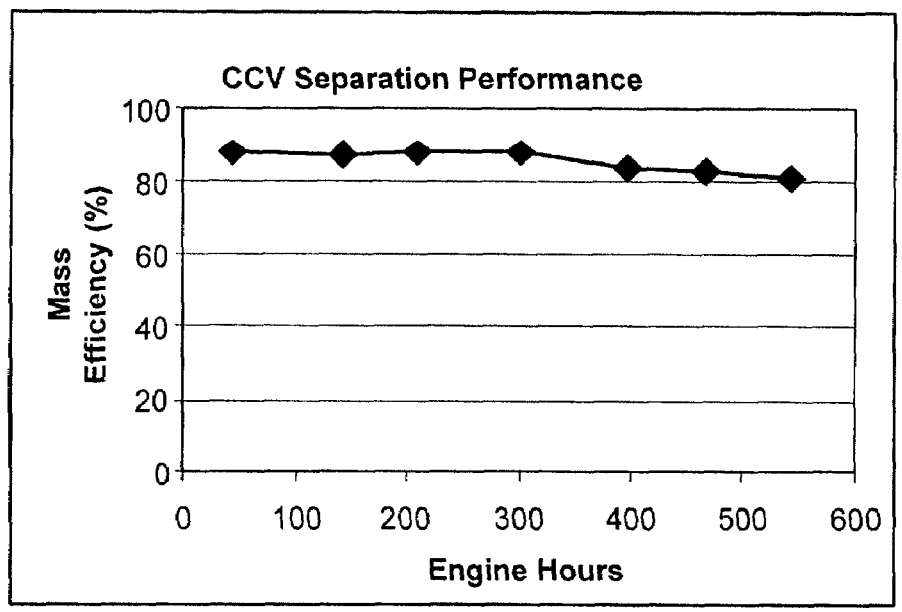
FIG. 15 is a graph showing the mass efficiency of a blow-by filter arrangement over its intended service life.

The filter arrangement disclosed herein uses a 2-stage filtration approach to blow-by lube oil aerosol coalescence: An inertial impaction filter followed by a high surface area diffusion filter. This 2-stage approach provides a combination of long life at high separation efficiencies with general performance stability. The test shown at FIG. 15 summarizes the mass efficiency of the filter arrangement over its intended service life.

Note the relatively constant nature of the mass efficiency. The time weighed average efficiency for this test was 85.6%. All data fell within ±4%. Recent improvements have increased performance levels to that in excess of 90% today.

Short Term Aging

Figure 16:
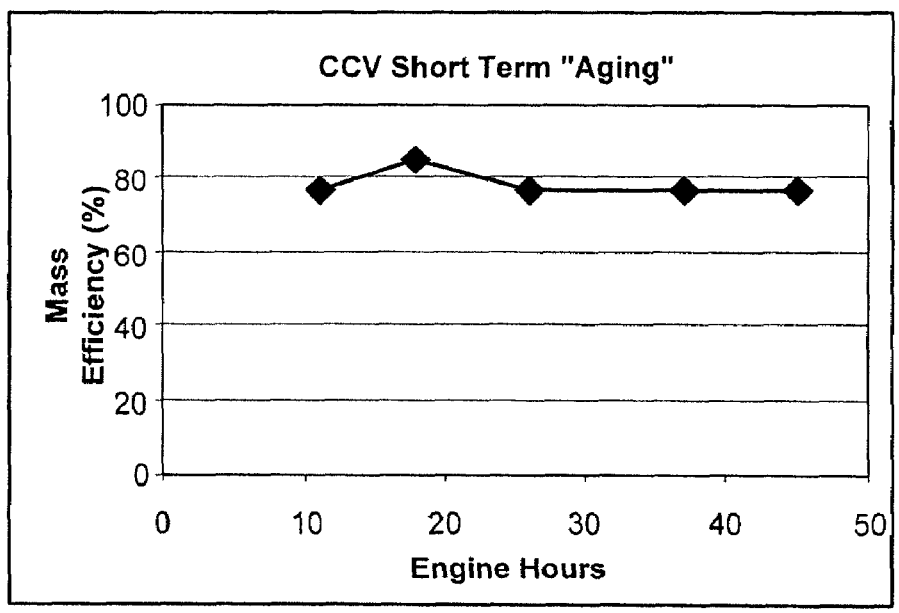
FIG. 16 is a graph showing short term aging for a blow-by filter arrangement.

To accurately measure a closed crankcase ventilation filtration system's performance during a short test time, one must condition or "age" the filter so that stable performance is developed. The disclosed filter arrangement achieves this stability in a relatively short time as the first stage adsorbs oil onto its coarse fiber surface. This adsorption actually improves its efficiency until it stabilizes. The second stage also adsorbs the finer oil aerosol and initiates coalescing with the assistance of its oliophobic coating. Its efficiency drops slightly from its brand new condition as it achieves stability. Thus, the initial "aging" of the two stages off-set each other as they reach an equilibrium. This is achieved within 24 hours of exposure to blow-by aerosol. The test shown at FIG. 16 shows data indicating this level of stability in the early life of the disclosed filter arrangement.

Note the constant nature of the mass efficiency, especially after 24 hours. Three standard deviations were within ±2% after the first 24-hour period. Again, improvements have increased performance levels to that in excess of 90% today.

B. THE EMBODIMENT OF FIGS. 9-14

FIGS. 9-12 illustrate four different embodiments of the catalytic converter and muffler 43 of FIG. 1. These are represented by references numerals 1001, 1002, 1003, and 1004. Each of the catalytic converter mufflers 1001-1004 includes an exhaust inlet 1005 and an exhaust outlet 1006. Exhaust gases from the engine 300 are directed to the catalytic converter mufflers 1001-1004 through the exhaust inlet 1005. Inside of each of the mufflers 1001-1004, the exhaust gases are treated by a catalyst, and the sound pressure level is reduced. The treated gases then flow through the exhaust gas outlet 1006 and through the tailpipe 45 (FIG. 1).

FIG. 13 shows a cross-sectional view of the muffler 1004. The cross-section of muffler 1004 is typical of the insides of each of the other mufflers 1001, 1002, and 1003 in that each of the mufflers 1001, 1002, and 1003 includes a catalytic converter honeycomb structure or monolith and sound pressure reduction structure.

The reference numeral 2001, FIG. 13, generally designates a muffler assembly according to the present invention. The muffler assembly 2001 has defined therein three general regions: an exhaust introduction, distribution and upstream acoustics region 2005; a catalytic converter region 2006; and a downstream acoustical or attenuation region 2007. Each of regions 2005, 2006, and 2007 may be constructed separately, with the overall assembly prepared through utilization of appropriate clamps, segments, etc. However, in preferred applications as shown in FIG. 13, it is foreseen that the segments 2005, 2006, and 2007 will be constructed in an overall unit 2010 having an outer shell 2011 with no segment seams or cross seams therein. By "cross seam" in this context it is meant that the shell 2011 is not segmented into longitudinally aligned segments, rather it comprises one longitudinal unit, typically (but not necessarily) having at least one and possibly more than one longitudinal seam.

Herein a unit 2010 which is constructed with no cross seams, i.e., as a single longitudinal unit, will be referred to as an "integrated" unit. To a certain extent, it may be viewed as a muffler assembly having a catalytic converter positioned operably therein. A unit constructed in segments aligned coaxially and joined to one another along cross seams will be referred to as a "segmented" arrangement. It will be understood that to a great extent the principles of the present invention may be applied in either "integrated" or "segmented" units or arrangements. It is an advantage of the preferred embodiment of the present invention, however, that it is well adapted for arrangement as an "integrated" unit.

As will be understood from the following descriptions, the muffler assembly 2001 according to the present invention is constructed to operate effectively and efficiently both as an exhaust noise muffler and as a catalytic converter. With respect to operation as an exhaust noise muffler, many of the principles of operation are found in, and can be derived from, certain known muffler constructions. With respect to these principles, attention is directed to U.S. Pat. Nos. 3,672,464; 4,368,799; 4,580,657; 4,632,216; and 4,969,537, the disclosure of each being incorporated herein by reference. With respect to constructing a catalytic converter and a muffler, attention is directed to U.S. Pat. No. 5,355,973, incorporated herein by reference.

Still referring to FIG. 13, muffler assembly 2001 comprises a cylindrical casing or shell 2011 of a selected predetermined length. Annular end caps 2013 and 2014 respectively define an inlet aperture 2017 and an outlet aperture 2018. The shell 2011 is generally cylindrical and defines a central longitudinal axis 2020. An inlet tube 2022 is positioned within inlet aperture 2017. The inlet tube 2022 has a generally cylindrical configuration and is aligned with its central longitudinal axis generally coextensive or coaxial with axis 2020. It is noted that end portion 2024 of inlet tube 2022 is configured in a manner non-cylindrical and described in detail hereinbelow, for advantage.

Outlet tube 2026 is positioned within outlet aperture 2018. Outlet tube 2026 includes a generally cylindrical portion 2027 aligned with a central longitudinal axis thereof extending generally coextensive with or coaxially with longitudinal axis 2020.

In use, the exhaust gases are directed: (1) into assembly 2001 by passage through inlet tube 2022 as directed by arrows 2030; (2) into the internal region or volume 2031 defined by casing or shell 2011; and, (3) outwardly from assembly 2001 by passage outwardly through outlet tube 2026 as indicated by arrows 2033. Within assembly 2001 both sound attenuation (muffling) and emission improvement (catalytic conversion) occurs.

Referring to region 2005, and in particular inlet tube 2022 positioned therein, the inlet tube 2022 is positioned and secured in place by end cap 2013 and internal baffle 2035. Preferably baffle 2035 is constructed so as not to be permeable to the passage of the exhaust gases therethrough or thereacross. Thus, baffle 2035 in cooperation with end cap 2013 and shell 2011 define a closed volume 2037.

For the embodiment shown in FIG. 13, inlet tube 2022 is perforated along its length of extension within assembly 2001, i.e., that portion of the tube 2022 positioned internally of end cap 2013 (that is positioned between end ca 2013 and end cap 2014) is perforated, as indicated by perforations 2038. Certain of the perforations allow gas expansion (and sound travel) into volume 2037, which assists in attenuation of sound to some degree. Regions such as volume 2037 may be generally referred to as "resonating chambers" or "acoustics", and similar structure positioned upstream of region 2006 and also constructed and arranged for sound attenuation, will be referred to herein as "upstream acoustics."

The portion 2042 of inlet tube 2022 which projects inwardly of baffle 2035; i.e., which extends over a portion of the volume between baffle 2035 and outlet end cap 2018 operates as a flow distribution construction or element 2044. The flow distribution element 2044 generates distribution of exhaust gas flow within volume 2045, i.e., the enclosed volume of shell 2011 positioned immediately inwardly of baffle 2035, for advantage. Portion 2042 of inlet tube 2022 includes previously defined end portion 2024.

Positioned immediately downstream of inlet tube 2022 is catalytic converter 2050. Catalytic converter 2050 includes a substrate 2051 having catalyst appropriately positioned thereon. The substrate 2051 is gas permeable, i.e., the exhaust gases pass therethrough along the direction of arrow 2053. The catalytic converter 2050 includes sufficient catalyst therein to effect the desired conversion in the exhaust gases as they pass therethrough. Herein this will be referred to as "an effective amount" of catalyst. The substrate 2051 is sized appropriately for this. Greater details concerning the preferred catalytic converter 2050 is provided hereinbelow.

Preferably the flow distribution element 2044 is sized and configured appropriately to substantially evenly distribute exhaust flow against the entire front or upstream surface 2055 of the catalytic converter 2050. In this manner, lifetime of use in the catalytic converter 2050 is enhanced. Also, the more effective and even the distribution, the less likelihood of overload in any given portion of the catalytic converter 50. This will facilitate utilization of a catalytic converter minimal or relatively minimal thickness, which is advantageous. By the term "substantially evenly" in this context it is meant that flow is distributed sufficiently to avoid substantial "dead" or "unused" volume in converter 2050. Generally, as even a distribution as can be readily obtained, within acceptable backpressure limits is preferred.

In general, the catalytic converter 2050 provides for little or no sound attenuation within the muffler. Thus, the space utilized by the catalytic converter is space or volume of little or no beneficial effect with respect to muffler operation. Under such conditions, minimal thickness or flow path catalytic converter will be preferred, so as not to substantially inhibit muffler (attenuation) operation.

It has been determined that there is a preferred positioning of the catalytic converter 2050 relative to the flow distribution element 2044, for advantageous operation. In particular, most preferred operation occurs when the catalytic converter 2050 is not positioned too close to the flow distribution element 2044, but is also not positioned too far therefrom. Discussion of studies with respect to optimizing the position of the catalytic converter 2050 relative to the flow distribution element 2044 are provided hereinbelow, in detail.

For the arrangement shown in FIG. 13, flow distribution element 2044 comprises end 2024 of tube 2022 crimped or folded into a "star" or "four finned" configuration. Such an arrangement has been used in certain types of muffler assemblies before, see for example Wagner et al. '537 referred to above and incorporated herein by reference. In general, the crimping creates closed edges 2056 and facilitates flow distribution. Unlike for conventional muffler arrangements, for the embodiment of FIG. 13 this advantageous distribution is applied in order to achieve relatively even cross-sectional distribution of airflow into and through a catalytic converter 2050, to advantage. Alternative flow distribution arrangements may be utilized in some applications.

The portion 2060 of the muffler assembly 2001 in extension between the downstream surface 2061 of the catalytic converter 2050 and the outlet end cap 2014 is referred to herein as the downstream acoustical or attenuation segment or end 2007 of the assembly 2001. It is not the case that all sound attenuation which occurs within the assembly 2001 occurs within this region. However, the majority of the sound attenuation will occur in this portion of the assembly 2001.

In general, the downstream acoustical segment 2007 comprises structure placed to facilitate sound attenuation or sound control. In typical constructions, resonating chambers or the like will be included therein. One such construction is illustrated in FIG. 13. The particular version illustrated in FIG. 13 utilizes a sonic choke arrangement 2065 therein in association with resonating chambers, to achieve sound attenuation. It will be understood that a variety of alternate arrangements may be utilized.

Referring more specifically to FIG. 13, acoustical or attenuation segment 2007 includes therein a converging or sonic choke arrangement 2065 supported by sealed baffle 2066. In general, the volume 2068 upstream from sealed baffle 2066 will be constructed or tuned for advantageous low frequency sound attenuation. Such tuning will in general concern the precise location of the sealed baffle 2066, i.e., adjustment in the size of volume 2068. Constructions in which a sonic choke assembly similar to that illustrated as 2065 are positioned within a muffler assembly 2001 by a sealed baffle 2066 advantageously, are described in U.S. Pat. Nos. 3,672,464 and 4,969,537 incorporated herein by reference.

In general, sonic coke assembly 2065 comprises a tube member 2075 mounted coaxially with outlet tube 2026 and, together with outlet tube 2026, supported by baffles 2066 and 2077, and outlet end cap 2018. In certain constructions such as that shown in FIG. 13, tube member 2075 may comprise an extension of an overall tube having no cross seam which includes both the tube member 2075 and the outlet tube 2026 as portions thereof. Alternately stated, for the embodiment shown in FIG. 13, the outlet tube 2026 comprises an end portion of tube member 2075. In the alternative, the outlet tube 2026 may comprise a separate extension of material from tube member 2075; the outlet tube and tube member being joined along a cross seam such that they are oriented substantially coaxial with one another.

For the embodiment shown, the tube member 2075 defines a central longitudinal axis positioned generally coextensive and coaxial with axis 2020. In some constructions, a tube member 2075 with a longitudinal axis off-set from alignment with the inlet axis may be used.

Still referring to FIG. 13 tube member 2075 in combination with outlet tube 2026 defines exit flow for exhaust gases passing along the direction of arrow 2053 through catalytic converter 2050. More specifically, such gases pass through an interior 2080 of the tube member 2075 and outwardly through outlet tube 2026, as indicated at arrows 2033.

Between baffles 2066 and 2077, and externally of tube member 2075, a volume 2085 is defined within shell 2011. An extension 2088 of the combination of tube member 2075 and outlet tube 2026 extending through volume 2085 is perforated as shown by perforations 2084, to allow for expansion of gases into volume 2085. Volume 2085 will operate as a resonator or resonating chamber for attenuation of sound, in particular continued attenuation of low frequency and much of the medium frequency attenuation. The size of the volume 2085 may be selected so that it is tuned for preferred sound attenuation including some high frequency attenuation as well.

Similarly, between baffle 2077 and end cap 2014 chamber 2090 is defined, externally of tube member 2075 and outlet tube 2026, and internally of shell 2011. The portion 2091 of outlet tube 2026 extending between baffle 2077 and end cap 2014 is perforated, to allow expansion of gases (and leakage of soundwaves) into volume 2090. The size and configuration of volume 2090 may be tuned for selected medium and high frequency sound attenuation.

Still referring to FIG. 13, tube member 2075 includes a conical end 2092 which converges from point 2093 to neck 2094, i.e., it converges in extension toward the catalytic converter. On the opposite side of neck 2094 from point 2091, the tube member 2075 diverges at flange 2095 to lip 2096; lip 2096 defining a re-entry port for gases passing through assembly 2001. Such a construction is advantageous for preferred muffler operation and sound attenuation. As indicated above, such a construction is referred to herein as a sonic choke. Sonic chokes are described generally in Rowley et al. U.S. Pat. No. 3,672,494, incorporated herein by reference.

In general, a portion of the soundwaves existing in the gaseous medium of volume 2031 are inhibited from passing through the tube member 2075 by increased acoustical impedance encountered at the narrow neck 2094. Such waves are reflected back, which serves to attenuate the sound level.

C. THE CONSTRUCTION OF THE CATALYTIC CONVERTER

As indicated generally above, a variety of constructions may be utilized for the catalytic converter 2050.

The catalytic converter 2050 comprises a ceramic structure having a honeycomb-like configuration defining a plurality of longitudinal flow channels extending therethrough. Referring to FIG. 14, the ceramic construction is indicated generally at 2100. For mounting within the assembly 2001, the ceramic core 2100 is provided in a circular configuration, i.e. core 2100 defines a cylindrically shaped item. Although alternate configurations are possible, the cylindrical one described and shown is advantageous for positioning within a cylindrical shell 2011.

A ceramic cylinder having a large plurality of longitudinal channels extending therethrough is a somewhat brittle configuration. It is therefore preferably mounted such that it will be dampened from the shocks and vibrations generally associated with a muffler assembly in a diesel powered vehicle. For the arrangement of FIGS. 13 and 14, the ceramic core 2100 is provided with a dampening mantle or wrap 2101 in extension around an outer periphery 2102 thereof. The mantle 2101 should be provided from a flexible, heat resistant material, such as a vermiculite pad. The material Interam® Mat III available from 3M, St. Paul, Minn. 55144 is usable. In general, for the arrangement shown the mantle 2101 would be about 0.12 in. (0.3 cm) to 0.25 in. (0.64 cm) thick.

For the preferred embodiment the mantle 2101 is retained against the core 2100 by retaining means such as a cylindrical casing 2105 of sheet metal. Preferably the casing 2105 is provided not only in extension around the outside of the mantle 2101, but also with a pair of side flanges bent toward the front face 2055 and rear face 2061, respectively, of the core 2100 to contain the mantle 2101. That is, casing 2105 has first and second side lips or rims 2106 and 2107 folded toward opposite sides of the core 2100. Preferably a circular loop of rope or O-shaped gasket 2109 is provided underneath each of the rims 2106 and 2107, to facilitate secure containment of the core 2100 and mantle 2101 within the casing 2105, without damage.

Referring to FIGS. 13 and 14, it will be understood that the preferred catalytic converter 2050 illustrated is a self contained or "canned" unit, positioned with shell 2011. The converter comprises a ceramic core 2100 positioned within a casing 2105, and protected therein by the mantle 2101 and rope rings 2109. The converter 2050 can thus be readily welded or otherwise secured and placed within shell 2011, with good protection of the core 2100 from extreme vibrations within the assembly 2001. In addition, the mantle 2101 and rings 2109 will help protect the converter 2050 from premature deterioration due to flow erosion.

In a typical system, it is foreseen that the ceramic core 2100 will comprise an alumina magnesia silica (crystalline) ceramic, such as cordierite, extruded from a clay, dried and fired to a crystalline construction. Techniques for accomplishing this are known in the ceramic arts. In many, crystalline ceramics are prepared as catalytic converter cores by application of a wash coat thereto and then by dipping the core into a solution of catalyst. In some, the wash coat and catalyst are applied simultaneously. Typical catalysts utilized would be metallic materials, such as noble or precious metal catalysts, including for example platinum, palladium and rhodium. Other materials such as vanadium have also been used in catalytic converters.

In general, for use within a diesel engine muffler assembly, it is foreseen that the core 2100 should be extruded with a cell density of longitudinal passageways of 200 cells/in$^2$ to 600 cells/in$^2$.

As indicated above, alternate constructions for the catalytic converter may be utilized. One such alternate construction would be to construct the core from a metallic foil substrate, rather than a ceramic.

D. OPERATIONS TO REDUCE TOTAL EMISSIONS

In reference again to FIG. 1, the diesel engine 30 includes a crankcase emissions area or region generally at 31. The engine 30 also has a tailpipe emissions area generally at 46. Together, the emissions from the crankcase emissions area 31 and the tailpipe emissions area 46 constitute, in this context, "total emissions." The diesel engine 30 can be one of many types of diesel engines. For example, the diesel engine 30 can be: a 2000 Caterpillar 3126 having 300 horsepower; a 1998 Detroit Diesel Series 60 having 450 horsepower; or a 1991 Detroit Diesel Series 60 having 350 horsepower. In general, it is observed that there are significant emissions coming from the crankcase vent 31. These emissions can be anywhere from 10%-50% of the tailpipe emissions. The emissions coming from the crankcase vent can be in the form of an aerosol containing particulate matter, hydrocarbons, and/or wear metals. This aerosol can contribute to deterioration of asphalt, roadways, etc.

It is advantageous to reduce the total emissions of the system 28 containing the diesel engine 300 by treatment in the crankcase emissions area 31 and the tailpipe emissions area 46. In general, emissions from the crankcase of the engine 30, such as blow-by gas, leaves the crankcase through the breather port in the emissions area 31. The crankcase emissions are treated by, first, coalescing the fine oil phase or aerosol phase of the crankcase emissions. As this aerosol is coalesced into droplets, it will drain as a liquid, for example, to the oil sump region 41 of the engine 30. The gas portion that remains after the coalescing step is then filtered for the removal of particulate material, such as soot, dust, wear metals, and/or other particulates. The filtered gas may then be directed back into the turbo 34 of the engine 30.

Exhaust emissions are passed from the engine 30, and before exiting from the emissions area 46 through the tailpipe 45, the exhaust gases are treated. The exhaust gases are treated by exposing them to a diesel oxidation catalyst. The catalyst allows for the oxidation of hydrocarbons in the gaseous phase to reduce the concentration of hydrocarbons in the gas stream. This can result in a lower amount of hydrocarbons being adsorbed onto the surface of the carbonaceous particles or soot in the exhaust stream. Thus, this results in a mass reduction in the tailpipe emissions.

Together, treating the emissions from the crankcase at the crankcase emissions area 31 and treating the exhaust stream results in a reduction of total emissions of the engine 30 over systems that do not treat the crankcase emissions area or the tailpipe emissions area at all. Also, treating both crankcase emissions and tailpipe emissions results in a reduction and over systems that treat the emissions in just one area but not the other (for example, systems that treat only the crankcase emissions but not the tailpipe emissions or systems that treat only the tailpipe emissions but not the crankcase emissions). Fuels usable to advantage include low sulfur diesel (LSD) fuel with 350 ppm sulfur level and an ultra low sulfur diesel (ULSD) fuel with 8 ppm sulfur level. Also usable with the systems described herein are emulsified forms for fuel. such as water-diesel fuel emulsions, as described in, for example, US patent publication US 2003/0084658 A1.

E. EXPERIMENTAL

Experimental testing was conducted to compare the emission performance of three different turbocharged heavy-duty diesel engines, equipped with a Donaldson diesel oxidation catalyst (DOC) muffler (Serials 6000 catalyst formulation) as described in FIGS. 9-14, along with a Donaldson Spiracle™ blow-by filter unit as described in FIGS. 2-8, to engine baseline exhaust gaseous emissions and total emissions, which were defined as the sum of exhaust and crankcase blow-by PM (particulate matter) emissions.

The testing included tailpipe and crankcase emission testing using both open crankcase configuration (OCC) and closed crankcase configuration (CCC). The Donaldson Spiracle™ blow-by filter unit was used during the CCC. The OCC baseline testing was a separate measurement and did not affect the engine exhaust. When the engine was configured in an OCC, the crankcase effluent was routed through a sample filter to allow the collection of crankcase particulate. When the engine was configured in a CCC, the crankcase effluent was routed through the blow-by filter of FIGS. 2-8 before being directed into the intake of the engine. In this manner, crankcase emissions were separately measured for the baseline tests without the blow-by filter of FIGS. 2-8 installed and were added to the tailpipe emissions from the baseline tests to determine the total baseline particulate matter (PM) emissions. The total baseline PM emissions are defined as: Tailpipe PM+Crankcase PM.

Two different diesel fuels were used during these emission tests; on-road No. 2 low sulfur diesel (LSD) fuel with 350 ppm sulfur level and a No. 2 ultra low sulfur diesel (ULSD) fuel with 8 ppm sulfur level. The engine operations and exhaust emission measurements complied with EPA's Code of Federal Regulations (CFR 40, Section 86, Subpart N), and the blow-by emission tests complied with Southwest Research Institute's Standard Operating Procedure 07-043, titled "Blow-By Emissions Measurement of Heavy-Duty Diesel Engines".

Tables 1-4 show the results of tests that:

(i) demonstrate the effect of filtering only exhaust gases through a catalytic converter compared to not filtering exhaust gases through a catalytic converter; and (ii) demonstrate the effect on total emissions (crankcase+tailpipe) of filtering crankcase gases through a blow-by filter of the type described in FIGS. 2-8 above and filtering exhaust gases through a DOC catalytic converter muffler of the type described in FIGS. 9-14.

TABLE 1

Model Year 1991 DDC Series GO, 12.7 L, 350 HP

| Test | Fuel Used | PM Emissions g/bhp-hr | Tailpipe PM % Reduction | Total PM (Tailpipe and crankcase) % Reduction) |
|---|---|---|---|---|
| Average Baseline Tailpipe | LSD (350 ppm) | 0.188 | | |
| Average baseline Crankcase | | 0.0180 | | |
| DOC Muffler of FIGS. 9–14 and Blow-By Filter of FIGS. 2–8 | LSD (350 ppm) | 0.150 | 20.2% | 27.2% |
| | ULSD (8 ppm) | 0.136 | 27.7% | 34.0% |

Note:
PM % Reduction (Relative to LSD - 350 ppm baseline)

TABLE 2

Model Year 1998 DDC Series GO, 12.7 L, 400 HP

| Test | Fuel Used | PM Emissions g/bhp-hr | Tailpipe PM % Reduction | Total PM (Tailpipe and crankcase) % Reduction) |
|---|---|---|---|---|
| Average Baseline Tailpipe | LSD (350 ppm) | 0.080 | | |
| Average baseline Crankcase | | 0.013 | | |
| DOC Muffler of FIGS. 9–14 and Blow-By Filter of FIGS. 2–8 | LSD (350 ppm) | 0.069 | 13.4% | 25.8% |
| | ULSD (8 ppm) | 0.062 | 22.5% | 33.3% |

Note:
PM % Reduction (Relative to LSD - 350 ppm baseline)

TABLE 3

Model Year 2000 CAT 3126, 7.2 L, 300 HP

| Test | Fuel Used | PM Emissions g/bhp-hr | Tailpipe PM % Reduction | Total PM (Tailpipe and crankcase) % Reduction) |
|---|---|---|---|---|
| Average Baseline Tailpipe | LSD (350 ppm) | 0.140 | | |
| Average baseline Crankcase | | 0.036 | | |
| DOC Muffler of FIGS. 9–14 and Blow-By Filter of FIGS. 2–8 | LSD (350 ppm) | 0.117 | 16.4% | 33.5% |
| | ULSD (8 ppm) | 0.092 | 34.3% | 47.8% |

Note:
PM % Reduction (Relative to LSD - 350 ppm baseline)

TABLE 4

Summary
Donaldson Technology Systems Performance: PM Reduction %

| | | LSD Baseline | |
|---|---|---|---|
| Technology System | Diesel Fuel | 1991–1993 Model Year Engines | 1994–2002 Model Year Engines |
| DOC Muffler of FIGS. 9–14 and Blow-By Filter of FIGS. 2–8 | LSD | 27.2 | 25.8, 33.5 |
| | ULSD | 34.0 | 33.3, 47.8 |

Summary conclusions from Tables 1-3 are:

When using LSD fuel as compared to LSD baseline for Tailpipe PM % reduction only, performance of the DOC (Series 6000) muffler arrangement (as described in FIGS. 9-14) was: 20.2%, 13.4% and 16.4%. This level of performance is below design and retrofit verification approval (CARB—California Air Resource Board) requirements of >25% PM reduction.

When using ULSD fuel as compared to LSD baseline for Tailpipe PM % reduction only, performance of the DOC (Series 6000) muffler arrangement of FIGS. 9-14 improved to: 27.7%, 22.5% and 34.3%. While ULSD fuel improves performance, performance at >25% PM reduction remains engine dependent and does not allow for reliable improvement over a wide range of engines.

When using either LSD or ULSD fuel as compared to LSD baseline, and using TOTAL PM (tailpipe PM+crankcase PM) measurements, and using the DOC (Series 6000) muffler arrangement of FIGS. 9-14 and the blow-by filter system of FIGS. 2-8, performance is improved. With LSD fuel, TOTAL PM reduction is generally 25% or greater, for example, 25-35%, specifically 27.2%, 25.8% and 33.5%. With ULSD fuel, TOTAL PM reduction is greater than 25%, for example, 25-50%, specifically 34.0%, 33.3% and 47.8%. These results are applicable to a broad range of engines including all highway, heavy-heavy and medium-heavy duty, 4 cycle, non-EGR, model year 1991-2003, turbocharged or naturally aspirated diesel engines ranging from 150 to 600 horsepower. Some specific, usable engines include:

| Model Year | Engine Family | Series |
|---|---|---|
| | CATERPILLAR | |
| 1991 | MCT0403FZC1 | 3116 |
| | MCT0403FZD2 | 3116 |
| | MCT0403FZE3 | 3116 |
| | MCT0629FZD4 | 3176 |
| | MCT0893FP8X | 3406 |
| | MCT0893FZD5 | 3406 |
| 1992 | NCT0403FZC0 | 3116 |
| | NCT0403FZD1 | 3116 |
| | NCT0403FZE2 | 3116 |
| | NCT0403FZF3 | 3116 |
| | NCT0629FZD3 | 3176 |
| | NCT0638FPCX | 3306 |
| | NCT0893FPB9 | 3406 |
| | NCT0893FZD4 | 3406 |
| 1993 | PCT0403FZC9 | 3116 |
| | PCT0403FZDX | 3116 |
| | PCT0403FZE0 | 3116 |
| | PCT0629FZD1 | 3176 |

-continued

| Model Year | Engine Family | Series |
|---|---|---|
| | PCT0629FZE2 | 3176 |
| | PCT0638FPC8 | 3306 |
| | PCT0893FPB7 | 3406 |
| | PCT0893FZD2 | 3406 |
| | PCT0893FZE3 | 3406 |
| | PCT0403FZF1 | 3116 |
| | NAVISTAR | |
| 1991 | MNV0360EPC7 | * |
| | MNV0360FPCX | * |
| | MNV0466EPC4 | * |
| | MNV0466FPC7 | * |
| 1992 | NNV0360EPC6 | * |
| | NNV0360FPC9 | * |
| | NNV0466EPA1 | * |
| | NNV0466FPC6 | * |
| 1993 | PNV0360FPC7 | DTA-360 |
| | PNV0408FPA2 | DT-408 |
| | PNV0408FPB3 | DT-408 |
| | PNV0466EPAX | DT-466 |
| | PNV0466FPC4 | DTA-466 |
| | PNV0466FPD5 | DTA-466 |
| | PNV0466FPE6 | DT-466 |
| | PNV0466FPF7 | DT-466 |
| | PNV0530FPA2 | * |
| | PNV07.3EPA2 | * |
| | CUMMINS | |
| 1991 | MCE0359FAA9 | B5.9 |
| | MCE0359FABX | B5.9 |
| | MCE0505FAA2 | C8.3 |
| | MCE0611FZA2 | L10 |
| | MCE0611FZB3 | L10 |
| | MCE0611FZD5 | L10 |
| | MCE0855FZA6 | N14 |
| | MCE0855FZB7 | N14 |
| | MCE0855FZC8 | N14 |
| | MCE0855FZD9 | N14 |
| 1992 | NCE0359FAA8 | B5.9 |
| | NCE0359FAB9 | B5.9 |
| | NCE0359FAB9 | B5.9 |
| | NCE0359FACX | C8.3 |
| | NCE0505FAA1 | C8.3 |
| | NCE0505FAB2 | C8.3 |
| | NCE0611FZA1 | L10 |
| | NCE0611FZB2 | L10 |
| | NCE0611F2B2 | L10 |
| | NCE0611FZD4 | L10 |
| | NCE0855FZA5 | N14 |
| | NCE0855FZB6 | N14 |
| | NCE0855FZC7 | N14 |
| | NCE0855FZD8 | N14 |
| | NCE0855FZFX | N14 |
| | NCE0855FZG0 | N14 |
| 1993 | PCE0359FAA6 | B5.9 |
| | PCE0359FAB7 | B5.9 |
| | PCE0359FAC8 | B5.9 |
| | PCE0359FAD9 | B5.9 |
| | PCE0505FAAX | C8.3 |
| | PCE0505FAB0 | C8.3 |
| | PCE0611FZAX | L10 |
| | PCE0611FZB0 | L10 |
| | PCE0661FZA2 | M11 |
| | PCE0661FZB3 | M11 |
| | PCE0855FZA3 | N14 |
| | PCE0855FZB4 | N14 |
| | PCE0855FZC5 | N14 |
| | PCE0855FZD6 | N14 |
| | PCE0855FZF8 | N14 |
| | PCE0855FZG9 | N14 |
| | PCE0855FZHX | N14 |
| | PCE0855FZK4 | N14 |
| | DDC | |
| 1991 | MDD11.1FZA2 | * |
| | MDD12.7FZAX | * |

-continued

| Model Year | Engine Family | Series |
|---|---|---|
| 1992 | NDD11.1FZA1 | * |
| | NDD12.7FZA9 | * |
| 1993 | PDD08.5FZB7 | * |
| | PDD08.5FZK7 | * |
| | PDD11.1FZAX | * |
| | PDD11.1FZD2 | * |
| | PDD12.7FZA7 | * |
| | PDD12.7FZDX | * |
| | MACK | |
| 1991 | MMT0728FAF1 | E7, EM7 |
| | MMT0728FAG2 | E7, EM7 |
| | MMT0728FAH3 | E7, EM7 |
| 1992 | NMT0728FAA6 | E7 |
| | NMT0728FAB7 | EM7 |
| | NMT0728FAC8 | EM7 |
| | NMT0728FAD9 | E7, EM7 |
| | NMT0728FAEX | E7 |
| | NMT0728FAF0 | EM7 |
| | NMT0728FAG1 | E7 |
| | NMT0728FAH2 | E7 |
| | NMT0728FAK7 | EM7 |
| | NMT0728FAL8 | EM7 |
| 1993 | PMT0728FAC6 | EM7 |
| | PMT0728FAD7 | EM7 |
| | PMT0728FAE8 | E7 |
| | PMT0728FAF9 | E7 |
| | PMT0728FAGX | E7 |
| | PMT0728FAH0 | EM7 |
| | PMT0728FAJ4 | EM7 |
| | PMT0728FAL6 | E7 |
| | PMTO728FAB5 | E7 |
| | FORD | |
| 1991 | MFM07.8FPK8 | * |
| 1992 | NFM07.8FPK7 | * |
| 1993 | none | * |
| | GENERAL MOTORS | |
| 1991 | none | * |
| 1992 | NGM06.5EAB5 | * |
| 1993 | none | * |
| | HINO | |
| 1991 | MHM03.8FAA0 | * |
| | MHM06.5FAA6 | * |
| 1992 | NHM03.8FAAX | * |
| 1993 | PHM03.8FAA8 | * |
| | PHM06.5FAA3 | * |
| | ISUZU | |
| 1991 | none | * |
| 1992 | NSZ0396FAB7 | * |
| 1993 | PSZ0396FAB5 | * |
| | MERCEDES BENZ | |
| 1991 | MMB5.96FAA3 | * |
| 1992 | NMB5.96FAA2 | * |
| | NMB12.0FAA4 | * |
| 1993 | PMB5.96FAA1 | * |
| | PMB12.0FAA2 | * |
| | MITSUBISHI | |
| 1991 | none | * |
| 1992 | NMM0302FAA0 | * |
| | NMM0460FAA6 | * |
| 1993 | PMM0302FAA9 | * |
| | PMM0460FAA4 | * |
| | NISSAN | |
| 1991 | none | * |
| 1992 | NND0423FAC9 | * |
| | NND0452FAC9 | * |
| 1993 | PND0423FAC7 | * |
| | PND0452FAC7 | * |

-continued

| Model Year | Engine Family | Series |
|---|---|---|
| PERKINS | | |
| 1991 | MPE0365FAA1 | Phaser 180Ti |
| 1992 | NPE0365FAA0 | Phaser 180Ti |
| 1993 | PPE0365FAA9 | Phaser 180Ti |
| RENAULT | | |
| 1991 | MRE033SFAA4 | * |
| 1992 | NRE0335FAA3 | * |
|  | NRE0377FAC0 | * |
|  | NRE0377FABX | * |
| 1993 | PRE0335FAA0 | * |
|  | PRE0377FAB6 | * |
|  | PRE0377FAC9 | * |
| VOLVO | | |
| 1991 | MVT06.7FAA1 | * |
|  | MVT12.0FAA0 | * |
| 1992 | NVT06.7FAA0 | * |
|  | NVT12.0FAAX | * |
|  | NVT12.0FAB0 | * |
| 1993 | PVT06.7FAA9 | * |
|  | PVT12.0FAA8 | * |
|  | PVT12.0FAB9 | * |
| MACK | | |
| 1994 | RMK728EGDARA | E7, EM7 |
|  | RMK728EJDARA | E7, EM7 |
| 1995 | SMK728EGDARA | E7, EM7 |
|  | SMK728EJDARA | E7 |
| 1996 | TMK728EGDARA | E7, EM7 |
|  | TMK728EJDARA | E7 |
| 1997 | VMK728EGDARA | E7, EM7 |
|  | VMK728EJDARA | E7, EM7 |
|  | VMK728EJDAYW | E7, EM7 |
| 1998 | WMKXH11.9E51 | E7 |
|  | WMKXH11.9E52 | E7 |
|  | WMKXH11.9E53 | EM7 |
| 1999 | XMKXH11.9E54 | E7 |
| 2000 | YMKXH11.9H56 | E7, EM7 |
|  | YMKXH11.9V57 | E7, EM7 |
| 2001 | 1MKXH11.9H56 | E7, EM7 |
|  | 1MKXH11.9H59 | E7 |
|  | 1MKXH11.9V57 | E7, EM7 |
|  | 1MKXH11.9V60 | E7 |
|  | 1MKXH11.9V61 | EM7 |
| 2002 | 2MKXH11.9H59 | E7 |
|  | 2MKXH11.9H63 | E7 |
|  | 2MKXH11.9V60 | E7 |
|  | 2MKXH11.9V61 | EM7 |
|  | 2MKXH11.9V65 | E7 |
|  | 2MKXH11.9V66 | EM7 |
|  | 2MKXH11.9V67 | E7 |
| ISUZU | | |
| 1994 | none | * |
| 1995 | none | * |
| 1996 | none | * |
| 1997 | none | * |
| 1998 | WSZXH07.84RA | * |
| 1999 | XSZXH07.84RA | * |
| 2000 | YSZXH07.84RA | * |
| 2001 | 1SZXH06.63RK | * |
| 2002 | 2SZXH07.84RA | * |
|  | 2SZXH06.64RA | * |
| MERCEDES BENZ | | |
| 1994 | RMB6.0D6DARA | * |
| 1995 | SMB6.0D6DARA | * |
| 1996 | none | * |
| 1997 | none | * |
| 1998 | WMBXH4.25DJA | * |
| 1999 | XMBXH6.37DJA | |
|  | XMBXH4.25DJA | |
| 2000 | YMBXH6.37DJA | |
|  | YMBXH4.25DJA | |
| 2001 | 1MBXH6.37DJC | |
|  | 1MBXH4.25DJA | |
|  | 1MBXH6.37DJA | |
|  | 1MBXH12.0DJA | |
|  | 1MBXH12.8DJA | |
| 2002 | 2MBXH4.25DJA | |
|  | 2MBXH6.37DJA | |
|  | 2MBXH6.37DJC | |
|  | 2MBXH12.0DJA | |
|  | 2MBXH12.8DJA | |
|  | 2MBXH15.9DJB | |
| CATERPILLAR | | |
| 1994 | RCP629EZDARA | * |
|  | RCP638EZDARA | * |
|  | RCP893EZDARA | * |
| 1995 | SCP403DZDARK | * |
|  | SCP442DZDARK | 3126 |
|  | SCP629EZDARK | * |
|  | SCP629EZDARM | C-10, 3176 |
|  | SCP638EZDARA | * |
|  | SCP729EZDARL | C-12 |
|  | SCP893EZDARK | * |
| 1996 | TCP403DZDARK | 3116 |
|  | TCP442DZDARK | 3126 |
|  | TCP629EZDARK | 3176 |
|  | TCP629EZDARM | C-10 |
|  | TCP638EZDARA | 3306 |
|  | TCP729E2DARL | C-12 |
|  | TCP893EZDARK | 3406 |
| 1997 | VCP403DZDARK | 3116 |
|  | VCP442DZDARK | 3126 |
|  | VCP629EZDARK | 3176 |
|  | VCP629EZDARX | C-10 |
|  | VCP638EZDARA | 3306 |
|  | VCP729EZDARX | C-12 |
|  | VCP893EZDARA | 3406 |
|  | VCP893EZDARX | 3406 |
|  | VCP967EZDARK | 3406 |
| 1998 | WCPXH0442HRK | 3126 |
|  | WCPXH0442HRK | 3126 |
|  | WCPXH0442HSK | 3126 |
|  | WCPXH0442HSK | 3126 |
|  | WCPXH0629ERK | C-10 |
|  | WCPXH0629ERK | C-10 |
|  | WCPXH0729ERK | C-12 |
|  | WCPXH0729ERK | C-12 |
|  | WCPXH0893ERK | 3406 |
|  | WCPXH0893ERK | 3406 |
|  | WCPXH0967ERK | 3406 |
|  | WCPXH0987ERK | 3406 |
| 1999 | XCPXH0442HRK | 3126 |
|  | XCPXH0442HSK | 3126 |
|  | XCPXH0629ERK | C 10 |
|  | XCPXH0729ERK | C 12 |
|  | XCPXH0893ERK | 3406 |
|  | XCPXH0967ERK | 3406 |
| 2000 | YCPXH0442HRK | 3126 |
|  | YCPXH0629ERK | C-10 |
|  | YCPXH0729ERK | C-12 |
|  | YCPXH0893ERK | C-15 |
|  | YCPXH0967ERK | C-16 |
| 2001 | 1CPXH0442HRK | 3126 |
|  | 1CPXH0629ERK | C-10 |
|  | 1CPXH0729ERK | C-12 |
|  | 1CPXH0893ERK | C-15 |
|  | 1CPXH0967ERK | C-16 |
| 2002 | 2CPXH0442HRK | 3126 |
|  | 2CPXH0629ERK | C-10 |
|  | 2CPXH0729ERK | C-12 |
|  | 2CPXH0893ERK | C-15 |
|  | 2CPXH0967ERK | C-16 |

| Model Year | Engine Family | Series |
|---|---|---|
| \multicolumn{3}{c}{NAVISTAR (INTERNATIONAL)} | | |
| 1994 | RNV466D6D0TW | * |
|  | RNV466D6DARW | DT 466HT, DT 466 |
|  | RNV466D6DASW | DT 466HT, DT 466 |
| 1995 | SNV444C8DORA | * |
|  | SNV444C8DOSA | * |
|  | SNV466D6DARA | DT 466HT, DT 466 |
|  | SNV466D6DASA | DT 466 |
|  | SNV466D6DATA | * |
|  | SNV466D8DARB | DT 466HT, DT 466 |
|  | SNV466D8DASB | DT 466 |
|  | SNV466D8DATB | * |
|  | SNV530D6DARA | * |
|  | SNV530E6DASA | * |
| 1996 | TNV444C8DORA | * |
|  | TNV444C8DOSA | * |
|  | TNV466D6DARB | DT 466, DT 466HT |
|  | TNV466D6DATB | * |
|  | TNV466D8DARB | DT 466, DT 466HT |
|  | TNV466D8DATB | * |
|  | TNV530D6DARA | * |
|  | TNV530D8DARA | * |
|  | TNV530E6DASA | * |
|  | TNV530E8DASA | * |
| 1997 | VNV444C8DARW | T444E |
|  | VNV444C8DASW | T444E HT |
|  | VNV466D6DARA | DT 466HT, DT 466 |
|  | VNV466D8DARW | DT 466E, DT 466 HT |
|  | VNV466D8DASA | * |
|  | VNV530D6DARA | 530 MGD |
|  | VNV530D8DARA | 530E |
|  | VNV530E6DASA | 530 HVY |
|  | VNV530E8DASA | 530E |
| 1998 | none | * |
| 1999 | XNVXH0444ANA | T 444E |
|  | XNVXH0444ANB | T 444E |
|  | XNVXH0466ANA | DT 466E |
|  | XNVXH0466ANB | DT 466E |
|  | XNVXH0530ANA | 530E |
|  | XNVXH0530ANB | 530E |
|  | XNVXH07.3ANF | 7.3 DIT |
|  | XNVXH07.3ANF | 7.3 DIT |
|  | XNVXA07.3CNJ | 7.3 DIT |
| 2000 | YNVXH0444ANA | 444 P |
|  | YNVXH0444ANB | T 444E |
|  | YNVXH0444ANC | T 444E |
|  | YNVXH0466ANA | DT 466E, DT 466E HT |
|  | YNVXH0466ANB | DT 466E, DT 466E HT |
|  | YNVXH0530ANA | DT 530E |
|  | YNVXH0530ANB | DT 530E, DT 530E HT |
|  | YNVXH07.3ANA | 7.3 DIT |
| 2001 | 1NVXH0444ANA | 444 P |
|  | 1NVXH0444ANB | T 444E |
|  | 1NVXH0444ANC | T 444E |
|  | 1NVXH0466ANA | DT 466, DT 466 HT |
|  | 1NVXH0466ANB | DT 466, DT 466 HT |
|  | 1NVXH0466ANB | DT 466, DT 466 HT |
|  | 1NVXH0530ANA | DT 530 |
|  | 1NVXH0530ANB | DT 530, DT 530 HT |
|  | 1NVXH07.3ANA | 7.3 DIT |
|  | 1NVXH07.3ANC | 7.3 DIT |
|  | 1NVXA07.3CND | 7.3 DIT |
| 2002 | 2NVXH0444ANA | T 444E |
|  | 2NVXH0444ANB | T 444E |
|  | 2NVXH0444ANC | T 444E |
|  | 2NVXH0466ANA | DT 466, DT 466 HT |
|  | 2NVXH0466ANB | DT 466, DT 466 HT |
|  | 2NVXH0530ANA | DT 530 |
|  | 2NVXH0530ANC | DT 530 |
|  | 2NVXH0530ANB | DT 530, DT 530 HT |
|  | 2NVXH07.3ANA | 7.3 DIT |
|  | 2NVXH07.3ANC | 7.3 DIT |
|  | 2NVXA07.3CND | 7.3 DIT |

| Model Year | Engine Family | Series |
|---|---|---|
| \multicolumn{3}{c}{CUMMINS} | | |
| 1994 | RCE611EGDARW | L10 |
|  | RCE661EJDARA | M11 |
|  | RCE661EJDARC | M11 |
|  | RCE661EJDARW | M11 |
|  | RCE855EJDARW | N14 |
|  | RCE855EJDASW | N14 |
| 1995 | SCE611EGDARW | L10 |
|  | SCE661EJDARA | M11 |
|  | SCE661EJDARC | M11 |
|  | SCE661EJDARW | M11 |
|  | SCE661EJDASW | M11 |
|  | SCE661EJDATW | M11 |
|  | SCE855EJDARA | N14 |
|  | SCE855EJDARB | N14 |
|  | SCE855EJDARW | N14 |
|  | SCE855EJDASW | N14 |
|  | SCE855EJDATW | N14 |
| 1996 | TCE661EJDARA | M11 |
|  | TCE661EJDARB | M11 |
|  | TCE661EJDARC | M11 |
|  | TCE661EJDARW | M11 |
|  | TCE661EJDASW | M11 |
|  | TCE661EJDATW | M11 |
|  | TCE855EJDARA | N14 |
|  | TCE855EJDARB | N14 |
|  | TCE855EJDARW | N14 |
|  | TCE855EJDASW | N14 |
|  | TCE855EJDATW | N14 |
| 1997 | VCE359DJDARA | * |
|  | VCE661EJDARB | M11 |
|  | VCE661EJDARC | M11 |
|  | VCE661EJDASA | M11 |
|  | VCE661EJDATW | M11 |
|  | VCE855EJDARA | N14 |
|  | VCE855EJDARB | N14 |
|  | VCE855EJDARC | N14 |
|  | VCE855EJDATW | N14 |
| 1998 | WCEXA0359BAH | ISB |
|  | WCEXH0359BAD | ISB |
|  | WCEXH0359BAE | ISB |
|  | WCEXH0505CAC | ISC |
|  | WCEXH0505CAD | ISC |
|  | WCEXH0505CAE | ISC |
|  | WCEXH0505CAF | ISC |
|  | WCEXH0661MAA | M11 |
|  | WCEXH0661MAB | M11 |
|  | WCEXH0661MAD | ISM |
|  | WCEXH0661MAE | ISM |
|  | WCEXH0855NAA | N14 |
|  | WCEXH0855NAB | N14 |
|  | WCEXH0855NAC | N14 |
|  | WCEXH0912XAA | Signature |
| 1999 | XCEXH0359BAJ | ISB |
|  | XCEXH0359BAK | ISB |
|  | XCEXA0359BAN | ISB |
|  | XCEXA0359BAT | ISB |
|  | XCEXH0505CAC | ISC |
|  | XCEXH0505CAD | ISC |
|  | XCEXH0505CAE | ISC |
|  | XCEXH0661MAH | ISM |
|  | XCEXH0661MAI | ISM |
|  | XCEXH0855NAD | N14 |
|  | XCEXH0855NAE | N14 |
|  | XCEXH0855NAF | N14 |
|  | XCEXH0912XAB | Signature |
|  | XCEXH0912XAD | ISX |
| 2000 | YCEXH0359BAO | ISB |
|  | YCEXH0359BAP | ISB |
|  | YCEXA0369BAZ | ISB |
|  | YCEXH0505CAG | ISC |
|  | YCEXH0505CAH | ISC |
|  | YCEXH0505CAI | ISC |
|  | YCEXH0540LAA | ISL |
|  | YCEXH0661MAH | ISM |

| Model Year | Engine Family | Series |
|---|---|---|
| | YCEXH0661MAI | ISM |
| | YCEXH0855NAD | N14 |
| | YCEXH0855NAE | N14 |
| | YCEXH0855NAF | N14 |
| | YCEXH0912XAC | ISX |
| | YCEXH0912XAD | ISx |
| | YCEXH0912XAE | Signature, ISX |
| 2001 | 1CEXA0359BAZ | ISB |
| | 1CEXH0239BAD | ISB |
| | 1CEXH0239BAE | ISB |
| | 1CEXH0359BAU | ISB |
| | 1CEXH0359BAV | ISB |
| | 1CEXH0505CAN | ISC |
| | 1CEXH0505CAO | ISC |
| | 1CEXH0505CAP | ISC |
| | 1CEXH0540LAA | ISL |
| | 1CEXH0540LAC | ISL |
| | 1CEXH0661MAQ | ISM |
| | 1CEXH0661MAR | ISM |
| | 1CEXH0855NAD | N14 |
| | 1CEXH0855NAE | N14 |
| | 1CEXH0855NAF | N14 |
| | 1CEXH0912XAC | ISX |
| | 1CEXH0912XAD | ISX |
| | 1CEXH0912XAE | Signature, ISX |
| 2002 | 2CEXA0359BAZ | ISB |
| | 2CEXH0239BAD | ISB |
| | 2CEXH0239BAE | ISB |
| | 2CEXH0359BAB | ISB |
| | 2CEXH0505CAN | ISC |
| | 2CEXH0505CAQ | ISC |
| | 2CEXH0540LAC | ISL |
| | 2CEXH0661MAS | ISM |
| | 2CEXH0855NAA | N14 |
| | 2CEXH0912XAF | ISX |
| HINO | | |
| 1994 | RHM3.8C7DARW | * |
| | RHM6.5D7DARW | * |
| 1995 | SHM6.5D7DARW | * |
| | SHM3.8C7DARW | * |
| 1996 | THM6.5D7DARW | * |
| | THM3.8C7DARW | * |
| 1997 | VHM8.0DHDARA | * |
| DDC | | |
| 1994 | RDD11.EJDARA | Series 60 |
| | RDD12.EJDARA | Series 60 |
| | RDD8.5EJDARA | Series 50 |
| | RDD8.5EJDARW | Series 50 |
| 1995 | SDD11.EJDARA | Series 60 |
| | SDD12.EJDARA | Series 60 |
| | SDD8.5EJDARA | Series 50 |
| | SDD8.5EJDARW | Series 50 |
| 1996 | TDD11.EJDARA | Series 60 |
| | TDD12.EJDARA | Series 60 |
| | TDD12.EJDATW | Series 55 |
| | TDD8.5EJDARA | Series 50 |
| | TDD8.5EJDARW | Series 50 |
| 1997 | VDD11.EJDARA | Series 60 |
| | VDD12.EJDARA | Series 60 |
| | VDD12.EJDATA | Series 55 |
| | VDD8.5EJDARA | Series 50 |
| 1998 | WDDXH11.1EHD | Series 60 |
| | WDDXH12.7EGD | Series 60 |
| | WDDXH08.5EJD | Series 50 |
| 1999 | XDDXH11.1EHL | Series 60 |
| | XDDXH12.7EGL | Series 60 |
| | XDDXH14.0ELL | Series 60 |
| | XDDXH08.5EJL | Series 50 |
| 2000 | YDDXH12.7EGL | Series 60 |
| | YDDXH14.0ELL | Series 60 |
| | YDDXH08.5EJB | Series 50 |
| | YDDXH08.5EJL | Series 50 |
| 2001 | 1DDXH12.7EGL | Series 60 |
| | 1DDXH14.0ELL | Series 60 |
| | 1DDXH08.5EJB | Series 50 |
| | 1DDXH08.5EJL | Series 50 |
| 2002 | 2DDXH12.7EGL | Series 60 |
| | 2DDXH14.0ELL | Series 60 |
| | 2DDXH08.5EJL | Series 50 |
| GENERAL MOTORS | | |
| 1994 | none | * |
| 1995 | none | * |
| 1996 | none | * |
| 1997 | VGM6.5C6DARW | * |
| 1998 | None | |
| 1999 | XGMXH06.5523 | |
| VOLVO | | |
| 1994 | RVT12.EJDBRA | VE D12 |
| | RVT6.7D6DBRA | VE D7A |
| 1995 | SVT12.EJDBRA | VE D12 |
| | SVT6.7D6DBRA | VE D7A |
| 1996 | TVT12.EJDBRA | VE D12 |
| | TVT6.7D6DBRA | VE D7A |
| 1997 | VVT12.EJDBRA | VE D12 |
| | VVT6.7D6DBRA | VE D7A |
| 1998 | WVTXH12.150S | VE D12B |
| | WVTXH07.350S | VE D7C |
| 1999 | XVTXH12.150S | VE D12B |
| | XVTXH07.399B | VE D7C |
| | XVTXH07.350S | VE D7C |
| 2000 | YVTXH07.350S | VE D7C |
| | YVTXH12.150S | VE D12C |
| 2001 | 1VTXH07.350S | VE D7C |
| | 1VTXH12.150S | VE D12 |
| 2002 | 2VTXH07.350S | VE D7C |
| | 2VTXH12.150S | VE D12 |

To reduce total emissions, existing engines (of the type described above) can be retrofitted with a diesel oxidation catalyst (DOC) muffler as described in FIGS. 9-14, along with a blow-by filter unit as described in FIGS. 2-8. A kit including both of these apparatus is provided in order to retrofit existing engines and enable the reduction of emissions by greater than 25%, and in some cases, up to 50%. These types of reductions in engines of the type above are achieved even though the systems do not make use of exhaust filter traps.

The above are examples. Many embodiments are contemplated.

What is claimed is:

1. A method for retrofitting a model year 1991-2003 on-highway diesel engine rated to produce between 150 and 600 horsepower, the diesel engine drawing intake air through an air intake structure including an air filter for filtering the intake air, the method comprising:
   (a) installing a blow-by filter for filtering blow-by gas generated by the diesel engine to reduce blow-by gas emissions, the blow-by filter being installed in gas-flow communication with a blow-by vent structure of the diesel engine and in further gas-flow communication with the engine air intake structure; and
   (b) installing a catalytic converter for treating exhaust gas generated by the diesel engine to reduce exhaust gas emissions, the catalytic converter being installed in gas-flow communication with an exhaust port structure of the diesel engine;
   wherein the blow-by filter and the catalytic converter provide at least a 25 percent reduction in total engine particulate matter emissions.

2. A method according to claim 1 wherein:
(a) said step of installing a blow-by filter includes installing a blow-by filter including:
   (i) a first end cap and a second end cap; the first end cap including a central gas stream inlet aperture;
   (ii) a second stage filter comprising a tubular construction of pleated media extending between the first end cap and the second end cap; the tubular construction of media defining an open tubular interior; the central gas stream inlet aperture of the first end cap being in flow communication with the open tubular interior;
   (iii) a first stage coalescer filter oriented in extension across the gas stream inlet aperture;
   (iv) the pleated media of the second stage filter, the first end cap, the second end cap, and the first stage coalescer filter being unitary in construction;
   (v) the first stage coalescer filter including a nonwoven fibrous bundle having a first upstream surface area; the second stage filter including pleated media having a second upstream surface area; and
   (vi) the first upstream surface area being no more than 10% of the second upstream surface area.

3. The method of claim 1, wherein the blow-by filter has a mass efficiency that exceeds 80 percent.

4. The method of claim 1, wherein the blow-by gas is directed to the air intake structure at a location downstream from the air filter.

5. A method for certifying compliance with governmental regulations for an emissions reduction retrofit of model year 1991-2003 on-highway diesel engines rated to produce from 150-600 horsepower, the method comprising:
   (i) measuring the untreated crankcase blow-by emissions of a model year 1991-2003 on-highway diesel engine rated to produce from 150-600 horsepower, the diesel engine drawing intake air through an air intake structure including an air filter for filtering the intake air;
   (ii) measuring the untreated exhaust emissions of the diesel engine;
   (iii) installing a blow-by filter in gas-flow communication with the engine blow-by gases from the engine blow-by vent structure and in further gas-flow communication with the engine air intake structure;
   (iv) installing a catalytic converter in gas-flow communication with the engine exhaust gases from the exhaust port structure;
   (v) measuring the treated exhaust gas emissions of the diesel engine; and
   (vi) determining that the treated exhaust gas particulate matter emissions are reduced relative to the combination of the untreated blow-by gas particulate matter emissions and the untreated exhaust gas particulate matter emissions by at least 25 percent.

6. A method for retrofitting a diesel engine, the diesel engine drawing intake air through an air intake structure including an air filter for filtering the intake air, the method comprising:
(a) installing a blow-by for filtering blow-by gas generated by the diesel engine to reduce blow-by gas emissions, the blow-by filter being installed in gas-flow communication with a blow-by vent structure of the diesel engine and in further gas-flow communication with the engine air intake structure; and
(b) installing an exhaust treatment device for treating exhaust gas generated by the diesel engine to reduce exhaust gas emissions, the exhaust treatment device being installed in gas-flow communication with an engine exhaust port structure of the diesel engine, the exhaust treatment device including a muffler, the exhaust treatment device also including a substrate positioned within the muffler for reducing the exhaust gas emissions, the substrate being catalyzed with a diesel oxidation catalyst to promote the oxidation of hydrocarbons, wherein the blow-by filter and the exhaust treatment device are configured to provide at least 25 percent reduction in total engine particulate matter emissions when the blow-by filter and the exhaust treatment device are used to retrofit a model year 1991-2003 on-highway diesel engine rated to produce from 150-600 horsepower.

7. The method of claim 6, wherein the blow-by filter and the exhaust treatment device are installed on a model year 1991-2003 on-highway diesel engine rated to produce from 150-600 horsepower so as to retrofit the diesel engine in a manner that satisfies the minimum reductions in emissions required by government regulations governing retrofits of model year 1991-2002 on-highway diesel engines rated to produce from 150-600 horsepower.

8. The method of claim 6, wherein the blow-by filter has a mass efficiency that exceeds 80 percent.

9. The method of claim 6, wherein the catalyzed substrate comprises a catalytic converter.

10. The method of claim 6, wherein the blow-by filter has a mass efficiency that exceeds 90 percent.

11. The method of claim 6, wherein the blow-by gas is directed to the air intake system at a location downstream of the air filter.

12. The method of claim 6, wherein the substrate includes a ceramic substrate having a honeycomb like configuration of longitudinal channels.

13. The method of claim 6, further comprising selling the blow-by filter and the exhaust treatment device as part of a retrofit kit.

* * * * *